US008262475B2

(12) United States Patent
Snow et al.

(10) Patent No.: US 8,262,475 B2
(45) Date of Patent: Sep. 11, 2012

(54) CHIPLESS TABLE SPLIT SCREEN FEATURE

(75) Inventors: Roger M. Snow, Las Vegas, NV (US); Nathan J. Wadds, Waverley (AU); Bradbury C. T. Glencross, Forresters Beach (AU); Murray Nicol, Milperra (AU); Weng Neng Choo, Ashfield (AU); Chet S. Sarwana, Woodcroft (AU)

(73) Assignee: Shuffle Master, Inc., Las Vegas, NV (US)

( * ) Notice: Subject to any disclaimer, the term of this patent is extended or adjusted under 35 U.S.C. 154(b) by 876 days.

(21) Appl. No.: 12/218,583

(22) Filed: Jul. 15, 2008

(65) Prior Publication Data

US 2010/0016050 A1 Jan. 21, 2010

(51) Int. Cl.
*A63F 9/24* (2006.01)
*A63F 13/00* (2006.01)

(52) U.S. Cl. ................. 463/31; 463/13; 463/46; 463/47

(58) Field of Classification Search .................... 463/46, 463/31
See application file for complete search history.

(56) References Cited

U.S. PATENT DOCUMENTS

| | | | |
|---|---|---|---|
| 1,831,580 | A | 11/1931 | Stecker |
| 2,023,210 | A | 12/1935 | Potter |
| 2,666,645 | A | 1/1954 | Phillips |
| 3,222,071 | A | 12/1965 | Lang |
| 3,735,982 | A | 5/1973 | Gerfin |
| 3,810,627 | A | 5/1974 | Levy |
| 3,876,208 | A | 4/1975 | Wächtler et al. |
| 3,909,002 | A | 9/1975 | Levy |
| 4,339,798 | A | 7/1982 | Hedges et al. |
| 4,467,424 | A | 8/1984 | Hedges et al. |
| 4,497,488 | A | 2/1985 | Plevyak et al. |
| 4,531,187 | A | 7/1985 | Uhland |
| 4,534,562 | A | 8/1985 | Cuff et al. |
| 4,614,342 | A | 9/1986 | Takashima |
| 4,711,371 | A | 12/1987 | Harrigan |
| 4,743,022 | A | 5/1988 | Wood |
| 4,750,743 | A | 6/1988 | Nicoletti |

(Continued)

FOREIGN PATENT DOCUMENTS

EP 1814091 A2 8/2007

(Continued)

OTHER PUBLICATIONS

Three (3) pictures taken of an Accuplay Table from TCS/John Huxley in use in an Arcade in Buylgaria, Feb. 2008.
Brochure from TCS/John Huxley for Touch Table MultiPLAY™ Roulette.
Nevada State Certificate of Registration for Trademark SAFEJACK to Mikohn Gaming Corporation of Las Vegas, Nevada dated Sep. 4, 1997.

(Continued)

*Primary Examiner* — Steven J Hylinski
(74) *Attorney, Agent, or Firm* — TraskBritt

(57) ABSTRACT

A system for playing a live game of chance using electronic wagering. The system uses a gaming table equipped with a card-reading apparatus and multiple dual-mode player/dealer displays, each with a player interface. Physical playing cards are electronically read and delivered to the gaming table. Electronic information of at least one of rank and count is provided to a game processor. The game processor also sends and receives player information to and from a player display. The player display is divided into two areas a first area displaying player information and a second area displaying dealer information. The player enters wagers and other play decisions through the player interface. The system displays information useful to the player on the first area and information useful to the dealer on the second area at appropriate intervals.

25 Claims, 13 Drawing Sheets

U.S. PATENT DOCUMENTS

| | | | | |
|---|---|---|---|---|
| 4,755,941 | A | 7/1988 | Bacchi | |
| 4,760,527 | A | 7/1988 | Sidley | |
| 4,805,907 | A | 2/1989 | Hagiwara | |
| 4,813,675 | A * | 3/1989 | Greenwood | 463/46 |
| 4,926,327 | A | 5/1990 | Sidley | |
| 4,948,134 | A | 8/1990 | Suttle et al. | |
| 5,022,653 | A | 6/1991 | Suttle et al. | |
| 5,033,744 | A | 7/1991 | Bridgeman et al. | |
| 5,067,713 | A | 11/1991 | Soules et al. | |
| 5,224,706 | A | 7/1993 | Bridgeman et al. | |
| 5,265,882 | A | 11/1993 | Malek | |
| 5,277,424 | A | 1/1994 | Wilms | |
| 5,288,081 | A | 2/1994 | Breeding | |
| 5,299,803 | A | 4/1994 | Halaby | |
| 5,308,065 | A | 5/1994 | Bridgeman et al. | |
| 5,326,104 | A | 7/1994 | Pease et al. | |
| 5,328,189 | A | 7/1994 | Malek | |
| 5,356,140 | A | 10/1994 | Dabrowski et al. | |
| 5,374,061 | A | 12/1994 | Albrecht | |
| 5,395,120 | A | 3/1995 | Malek | |
| 5,411,257 | A | 5/1995 | Fulton | |
| 5,411,270 | A | 5/1995 | Naka et al. | |
| 5,437,451 | A | 8/1995 | Fulton | |
| 5,437,462 | A | 8/1995 | Breeding | |
| 5,586,766 | A | 12/1996 | Forte et al. | |
| 5,586,936 | A | 12/1996 | Bennett et al. | |
| 5,586,937 | A | 12/1996 | Menashe | |
| 5,591,081 | A | 1/1997 | Suzuki | |
| 5,605,334 | A | 2/1997 | McCrea, Jr. | |
| 5,669,817 | A * | 9/1997 | Tarantino | 463/13 |
| 5,688,174 | A | 11/1997 | Kennedy | |
| 5,707,287 | A | 1/1998 | McCrea, Jr. | |
| 5,722,893 | A | 3/1998 | Hill et al. | |
| 5,735,525 | A | 4/1998 | McCrea, Jr. | |
| 5,769,417 | A | 6/1998 | Richer et al. | |
| 5,770,533 | A | 6/1998 | Franchi | |
| 5,779,546 | A | 7/1998 | Meissner et al. | |
| 5,803,809 | A | 9/1998 | Yoseloff | |
| 5,823,879 | A | 10/1998 | Goldberg et al. | |
| 5,863,041 | A | 1/1999 | Boylan et al. | |
| 5,863,042 | A | 1/1999 | Lo | |
| 5,911,626 | A | 6/1999 | McCrea, Jr. | |
| 5,934,998 | A * | 8/1999 | Forte et al. | 463/12 |
| 5,941,769 | A | 8/1999 | Order | |
| 5,975,528 | A | 11/1999 | Halaby | |
| 6,004,205 | A * | 12/1999 | Lauretta et al. | 463/11 |
| 6,039,650 | A | 3/2000 | Hill | |
| 6,074,720 | A | 6/2000 | Van Stratum | |
| 6,093,103 | A | 7/2000 | McCrea, Jr. | |
| 6,117,012 | A | 9/2000 | McCrea, Jr. | |
| 6,165,069 | A | 12/2000 | Sines et al. | |
| 6,196,547 | B1 | 3/2001 | Pascal et al. | |
| 6,254,484 | B1 | 7/2001 | McCrea, Jr. | |
| 6,270,404 | B2 | 8/2001 | Sines et al. | |
| 6,293,864 | B1 * | 9/2001 | Romero | 463/12 |
| 6,299,536 | B1 | 10/2001 | Hill | |
| 6,319,122 | B1 | 11/2001 | Packes, Jr. et al. | |
| 6,343,989 | B1 | 2/2002 | Wood et al. | |
| 6,346,044 | B1 | 2/2002 | McCrea, Jr. | |
| 6,386,973 | B1 | 5/2002 | Yoseloff | |
| 6,435,970 | B1 * | 8/2002 | Baerlocher et al. | 463/46 |
| 6,474,646 | B1 | 11/2002 | Webb | |
| 6,517,436 | B2 | 2/2003 | Soltys et al. | |
| 6,561,897 | B1 | 5/2003 | Bourbour et al. | |
| 6,565,432 | B2 | 5/2003 | Moody | |
| 6,575,831 | B1 | 6/2003 | Gonen | |
| 6,582,301 | B2 | 6/2003 | Hill | |
| 6,626,757 | B2 | 9/2003 | Oliveras | |
| 6,651,985 | B2 | 11/2003 | Sines et al. | |
| 6,659,866 | B2 | 12/2003 | Frost et al. | |
| 6,666,765 | B2 | 12/2003 | Vancura | |
| 6,676,517 | B2 | 1/2004 | Beavers | |
| 6,688,597 | B2 * | 2/2004 | Jones | 273/274 |
| 6,722,974 | B2 | 4/2004 | Sines et al. | |
| 6,743,094 | B2 | 6/2004 | Johnson | |
| 6,758,751 | B2 | 7/2004 | Soltys et al. | |
| 6,835,133 | B2 * | 12/2004 | Baerlocher et al. | 463/20 |
| 6,896,620 | B1 * | 5/2005 | Luciano et al. | 463/46 |
| 6,921,337 | B1 | 7/2005 | Kennedy et al. | |
| 6,939,224 | B2 | 9/2005 | Palmer et al. | |
| 7,008,324 | B1 | 3/2006 | Johnson et al. | |
| 7,048,629 | B2 | 5/2006 | Sines et al. | |
| 7,195,244 | B1 | 3/2007 | Feola | |
| 7,198,569 | B2 | 4/2007 | Wolf et al. | |
| 7,201,655 | B2 | 4/2007 | Walker et al. | |
| 7,201,661 | B2 | 4/2007 | Kennedy et al. | |
| 7,217,187 | B2 | 5/2007 | Vancura | |
| 7,255,351 | B2 | 8/2007 | Yoseloff et al. | |
| 7,255,642 | B2 | 8/2007 | Sines et al. | |
| 7,316,615 | B2 | 1/2008 | Soltys et al. | |
| 7,325,806 | B1 | 2/2008 | Feola | |
| 7,361,086 | B2 | 4/2008 | Gazdic et al. | |
| 7,367,563 | B2 * | 5/2008 | Yoseloff et al. | 273/292 |
| 7,374,170 | B2 | 5/2008 | Grauzer et al. | |
| 7,407,438 | B2 | 8/2008 | Schubert et al. | |
| 7,451,987 | B1 | 11/2008 | Feola | |
| 7,481,434 | B1 | 1/2009 | Feola | |
| 7,559,839 | B2 * | 7/2009 | Bahar | 463/25 |
| 7,775,887 | B2 * | 8/2010 | Kuhn et al. | 463/46 |
| 7,803,051 | B2 * | 9/2010 | Kuhn et al. | 463/36 |
| 7,878,892 | B2 * | 2/2011 | Sines et al. | 463/12 |
| 8,016,659 | B2 * | 9/2011 | Kuhn et al. | 463/17 |
| 2001/0000118 | A1 * | 4/2001 | Sines et al. | 273/274 |
| 2002/0002072 | A1 | 1/2002 | Sines et al. | |
| 2002/0022510 | A1 * | 2/2002 | Baerlocher et al. | 463/16 |
| 2002/0068635 | A1 | 6/2002 | Hill | |
| 2002/0077170 | A1 | 6/2002 | Johnson et al. | |
| 2003/0003997 | A1 | 1/2003 | Vuong et al. | |
| 2004/0003395 | A1 | 1/2004 | Srinivas et al. | |
| 2004/0185933 | A1 | 9/2004 | Nicely | |
| 2004/0224777 | A1 | 11/2004 | Smith et al. | |
| 2004/0229682 | A1 | 11/2004 | Gelinotte | |
| 2005/0062226 | A1 | 3/2005 | Schubert et al. | |
| 2005/0164759 | A1 | 7/2005 | Smith et al. | |
| 2005/0242500 | A1 | 11/2005 | Downs, III et al. | |
| 2005/0272501 | A1 | 12/2005 | Tran et al. | |
| 2006/0025213 | A1 | 2/2006 | Kane et al. | |
| 2006/0030400 | A1 | 2/2006 | Mathis | |
| 2006/0084505 | A1 | 4/2006 | Yoseloff et al. | |
| 2006/0131809 | A1 * | 6/2006 | Lancaster et al. | 273/292 |
| 2006/0217188 | A1 | 9/2006 | Walker et al. | |
| 2006/0226604 | A1 | 10/2006 | Saucier | |
| 2006/0234796 | A1 | 10/2006 | Nobrega et al. | |
| 2006/0279040 | A1 | 12/2006 | Downs, III et al. | |
| 2006/0281537 | A1 | 12/2006 | Abbott et al. | |
| 2007/0069462 | A1 | 3/2007 | Downs et al. | |
| 2007/0072682 | A1 | 3/2007 | Crawford et al. | |
| 2007/0205559 | A1 | 9/2007 | Webb et al. | |
| 2007/0238504 | A1 * | 10/2007 | Oliveras | 463/13 |
| 2007/0256111 | A1 | 11/2007 | Medford et al. | |
| 2007/0275762 | A1 | 11/2007 | Aaltone et al. | |
| 2008/0006996 | A1 | 1/2008 | Frankel et al. | |
| 2008/0006998 | A1 | 1/2008 | Grauzer et al. | |
| 2008/0037628 | A1 | 2/2008 | Boyce et al. | |
| 2008/0051171 | A1 | 2/2008 | Lutnick et al. | |
| 2008/0076500 | A1 * | 3/2008 | Lancaster et al. | 463/12 |
| 2008/0076506 | A1 * | 3/2008 | Nguyen et al. | 463/16 |
| 2008/0113764 | A1 * | 5/2008 | Soltys | 463/22 |
| 2008/0113772 | A1 * | 5/2008 | Burrill et al. | 463/25 |
| 2008/0113783 | A1 | 5/2008 | Czyzewski et al. | |
| 2008/0119257 | A1 | 5/2008 | Stern et al. | |
| 2008/0176617 | A1 | 7/2008 | Kekempanos et al. | |
| 2008/0258388 | A1 | 10/2008 | Schugar et al. | |
| 2008/0268933 | A1 * | 10/2008 | Sines et al. | 463/13 |
| 2008/0268939 | A1 * | 10/2008 | Sines et al. | 463/20 |
| 2008/0268940 | A1 * | 10/2008 | Sines et al. | 463/20 |
| 2008/0303210 | A1 | 12/2008 | Grauzer et al. | |
| 2009/0017888 | A1 | 1/2009 | Kuhn et al. | |
| 2009/0054161 | A1 | 2/2009 | Schubert et al. | |
| 2009/0069090 | A1 * | 3/2009 | Moser et al. | 463/42 |
| 2009/0098932 | A1 | 4/2009 | Longway | |
| 2009/0115133 | A1 | 5/2009 | Kelly et al. | |
| 2009/0131151 | A1 * | 5/2009 | Harris et al. | 463/22 |
| 2009/0140492 | A1 | 6/2009 | Yoseloff et al. | |
| 2009/0191933 | A1 | 7/2009 | French | |
| 2009/0224476 | A1 | 9/2009 | Grauzer et al. | |
| 2009/0286585 | A1 | 11/2009 | Walker | |

| | | | |
|---|---|---|---|
| 2010/0062845 | A1 | 3/2010 | Wadds et al. |
| 2011/0018195 | A1 | 1/2011 | Downs, III et al. |
| 2011/0198805 | A1 | 8/2011 | Downs, III et al. |

FOREIGN PATENT DOCUMENTS

| | | |
|---|---|---|
| WO | 02/30529 | 4/2002 |
| WO | 2007/067213 | 6/2007 |
| WO | 2007/103351 | 9/2007 |
| WO | 2008/028148 | 3/2008 |
| WO | 2008/091809 | 7/2008 |
| WO | 2009/025673 | 2/2009 |

OTHER PUBLICATIONS

*Dragon Bacc*, brochure, pub. Feb. 16, 2007 (2 pgs); retrieved Feb. 4, 2010 from DigiDeal Corporation Web site: http://www.digideal.com/products/dragonbacc.php.

International Search Report and Written Opinion for PCT/US2009/050562 for Chipless Table Split Screen Feature.

Extended European Search Report for corresponding EPO Application No. 10177548.4 dated Jan. 21, 2011; 8 pages.

* cited by examiner

CHIPLESS TABLE SPLIT SCREEN FEATURE

CROSS-REFERENCE TO RELATED APPLICATIONS

The subject matter of the present application is related to U.S. patent application Ser. No. 12/759,416, filed Apr. 13, 2010, pending, and entitled "Automated House Way Indicator and Commission Indicator," which is a continuation-in-part of U.S. patent application Ser. No. 12/572,205, filed Oct. 1, 2009, pending, and entitled "Automated House Way Indicator and Activator," which is a continuation-in-part of the present application; and International Application No. PCT/US2009/050562, entitled "Chipless Table Split Screen Feature," published in English as International Patent Publication WO 2010/009143.

FIELD

The present invention is directed to a chipless gaming table. The present invention relates to the field of gaming tables having player electronic data entry or input, particularly casino table wagering systems in which wagering is done with electronic wagering in the absence of chips, tokens, currency or coins being placed on a table as the wager, and, preferably, such a casino table wagering system in which physical playing cards are used in the play of a casino wagering card game on the system.

BACKGROUND

The chipless (and cashless) gaming technology of the present invention is so named because there is no necessity (and generally no capability) for using direct addition of chips, coins or currency by the player as wagering elements in the play of games on the chipless gaming table. Rather, credit is established for each player at each player position to enable wagering by player-exercised data entry (user input) at various stages of the game. The user input may also enable input of player selections in addition to wager amounts and wager types (e.g., on an underlying game, side bets, jackpots, raises, withdrawals and the like).

U.S. Pat. No. 5,779,546 to Meissner et al. describes a system for monitoring a card game. The system includes a dealer information screen for indicating player requests. A display consisting of a row of three light-emitting diodes (LEDs) is connected to the back of each player's touch screen so as to be visible by the dealer. These LEDs provide instructions to the dealer to advise him of the player's intentions (hold, deal, split, insurance, etc.). The display may be, for example, an LED display and may be positioned on the dealer's side of each player's touch screen (or elsewhere in a location visible to the dealer). The display is utilized as a quick reference source of instructions for the dealer for certain player choices such as: active, inactive, Hit, Stand, Split, etc.

U.S. Pat. No. 7,201,655 to Walker et al. and U.S. Pat. No. 6,319,122 to Packes, Jr., et al. describe systems that evaluate the rate of play of players on a video gaming system and increases awards, payouts or comps to the player based on the rate of play on a video gaming system.

U.S. Pat. No. 7,316,615 to Soltys et al. describes a system for recording the historical events in casino table card games, providing information on the numbers of hands played in a period of time by the dealer, and evaluating win/lose percentages for players and dealers.

U.S. Pat. No. 6,676,517 to Beavers discloses a casino table supervision and analysis system in which potential errors or fraud of the dealers is identified by tracking and analyzing electronically input data.

SUMMARY

A system for playing a live card game with electronic wagering is disclosed. Live casino card games are typically played on a standard gaming table surface embossed with the indicia specific to the game being played. The present system comprises a chipless table having multiple game software available. Individual game markings in one embodiment are not present, although individual casino or other logos may be printed thereon. A dealer, cards, a card-reading device, a game controller, a dealer interface and multiple player credit wagering interfaces are employed to facilitate the game being played. Players interested in playing a live table game sit at a player position at the table, and are required to purchase credit from the dealer to "buy-in" to the play session.

The dealer presides over the game, handles all "buy-ins," "cash-outs," and settles all wagers, as well as deals the cards in the game, resolves each game, and interacts with the players playing the game. Players may buy in with chips, or receive chips upon cashing out, but according to the invention, players play exclusively with credit. The dealer is a significant parameter in the speed and rate of play in casino games. The technology disclosed herein eliminates dealer error on payouts and increases efficiency.

DETAILED DESCRIPTION

Game profitability is influenced strongly by the speed at which a game is played. The speed of a game is based on the number of hands dealt per hour and the number of wagers settled per hour. Even where games may have a relatively high advantage and percentage hold by a casino, if the rate of play is low, then faster games with less advantageous house odds may produce more revenues. Considering the amount of dealer responsibility in the play of a game, even the very best dealers in the business are slowed down during a game. The time it takes to accurately deal the card game, resolve the card hands in a game, settle all wagers, facilitate cash-outs, resolve disputes and handle buy-ins can quickly accumulate into a substantial and costly time frame. In the casino business, time spent on gaming is money, and when time is not spent playing the games, money is lost.

In addition to the time element, there are the issues of accuracy. Sometimes players are paid on wagers that should go to the house, and there are times when players should be paid and their wagers are forfeited to the house. There are times players are given more chips than they paid for, and there are times when players and/or dealers cheat the house by capping and/or pinching wagers.

Therefore, it is desirable to provide a system that facilitates the speed and accuracy of a live card game without disturbing the unique environment a live card game offers players.

Chipless table games operate on credit instead of using traditional gaming chips. Therefore, the need for chips is eliminated except optionally for when cashing a customer in or out. The use of the credit-based system speeds up game play by eliminating time the dealer would spend exchanging cash for gaming chips, calculating and paying wins, and increasing hands per hour. This also increases revenue for the casino by increasing play and eliminating dealer error in paying out wins to customers.

The use of a chipless gaming table eliminates the cost of purchasing chips. Wager amounts are electronically recorded, eliminating the need for more costly RFID (radio frequency identification) chips and antennas.

Figure 12:
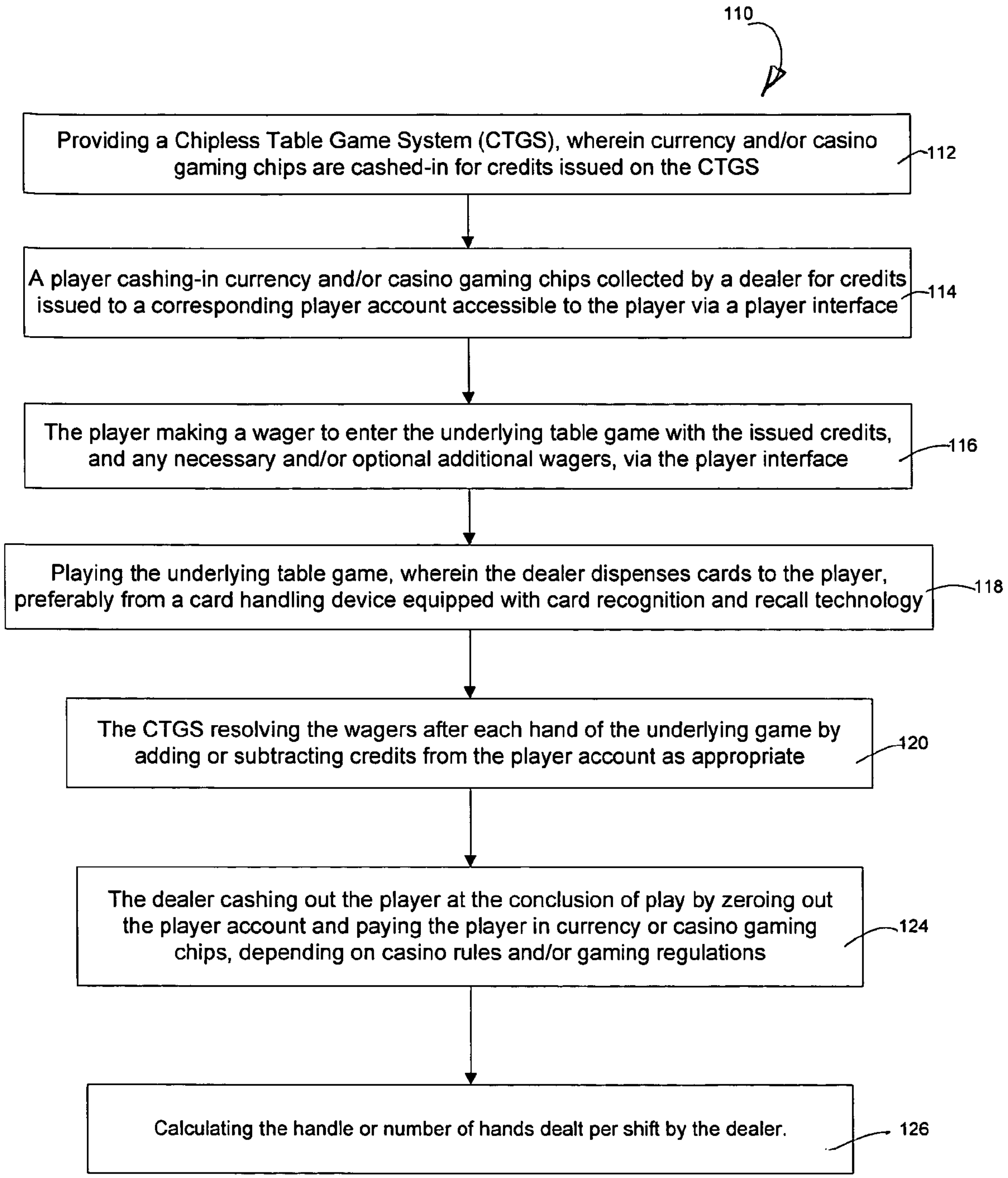
FIG. 12 is a flow diagram of an exemplary process of the present invention.

FIG. 12 is a flow diagram for the method of the present invention, generally referred to as numeral 110. A Chipless Table Game System (CTGS) is provided at step 112. The CTGS generally has a dealer station with a dealer interface and a plurality of player stations, each including a player interface, such as a touch screen, and operates with purchased credits instead of casino gaming chips. At step 114, a dealer "cashes-in" a player wishing to join the underlying table game by accepting currency or casino gaming chips and issuing credits for a player to wager with to a corresponding player account accessible to the player via the player interface.

At step 116, the player makes a wager to enter the underlying table game using the credits and also makes any other necessary or optional additional wagers to continue play via the player interface. Then at step 118, the underlying table game proceeds as usual. The dealer dispenses physical cards to the player, preferably from a card-handling device equipped with card recognition and/or hand recall technology. Hand recall information is useful when the game requires a fixed number of cards dealt to each player, and the final hand is determined at the point that the hand is dealt.

Upon conclusion of a hand of play in the underlying game, step 120, the CTGS automatically resolves the wagers by adding or subtracting credits to the corresponding player accounts as appropriate. The dealer then cashes-out the player at step 124, by zeroing out or resetting the player account and paying the player for any winnings or balance on the account in currency or casino gaming chips, depending on casino rules and/or gaming regulations.

At step 126, the CTGS calculates the handle or number of hands dealt per shift by the dealer. This information may be downloaded from the CTGS manually or networked with the house computer system to do this automatically.

As defined herein, a "chipless gaming table" is a traditional live table game experience on a novel gaming platform that includes a casino game played according to predetermined set(s) of rules, at least one dealer, physical playing cards, and at least one player to place at least one electronic wager to participate in the game provided. The chipless gaming table includes a plurality of electronic player displays and touch screen wagering interfaces, the displays flush-mounted into the gaming table surface, wherein players place wagers and execute game decisions electronically on displays equipped with touch screen controls (e.g., liquid crystal diode screens, LCD screens) and/or other touch screen forms of suitable user interface technology while playing a live table game.

In a preferred embodiment, the chipless gaming table includes a dealer PC/game server, wherein the dealer PC/game server is located where it is easily accessed by the dealer, for example, through a dealer I/O (input/output) system, which may be in front of the dealer, to the side of the dealer (on or associated with the table) and/or in a chip tray.

Preferably, the PC/game server is operatively associated with an intelligent card-handling and/or card-reading device located on the table. The device preferably has card-reading capabilities. The intelligent card-handling device (i.e., a card-reading shoe or shuffler) correlates read card rank and suit information with known stored card values and transmits the correlated card data to the dealer PC/game server for use in administering the game. Although card-handling devices that read special card markings on cards can be used as a part of the disclosed systems, it is preferred that the intelligent card-reading devices read the standard rank and/or suit markings on conventional playing cards, eliminating the need for the casino to use specially marked cards.

The dealer PC/game server has a main game controller programmed with the rules of the game (and, optionally, other games) being executed at a table, wherein the dealer PC/game server receives and correlates the card information received from the card-handling device with known game outcomes and the dealer PC/game server determines a game outcome(s) based on the actual dealt card values. The dealer PC/game server is in communication with a plurality of electronic wagering interfaces, wherein each electronic wagering interface transmits, and receives, up-dated game and wagering information as each game progresses and as each game is eventually concluded.

Figure 11:
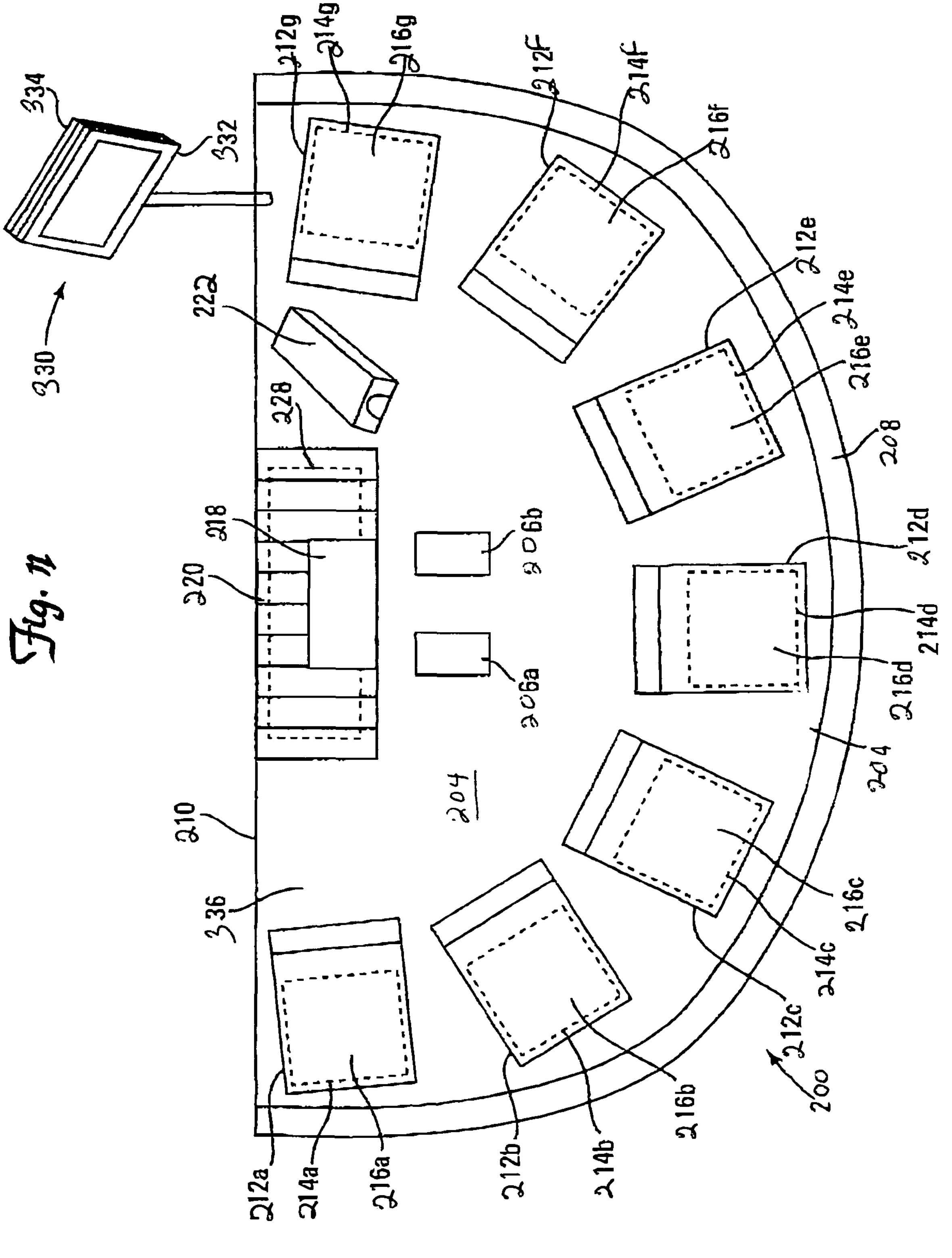
FIG. 11 shows an embodiment of a table system layout for chipless gaming tables described herein.

One preferred embodiment of a player display for the chipless gaming table features LCD touch screen technology, but plasma and/or other suitable technology may be employed as desired. Preferably, a plurality of displays with touch screen controls are flush mounted into a gaming table surface at each player position (as shown in FIG. 11, and as described in detail elsewhere). The controls in one embodiment are divided into two separate areas and the different areas serve a number of purposes, including functioning as a player wagering interface. It is preferred that each display has its own processor, wherein each processor controls its own display, and each display processor is in communication with a main game controller/game server. In a preferred form of the invention, the display processor administers graphics functions of the display. All other game events are administered by the main game controller/game server.

Figure 1:
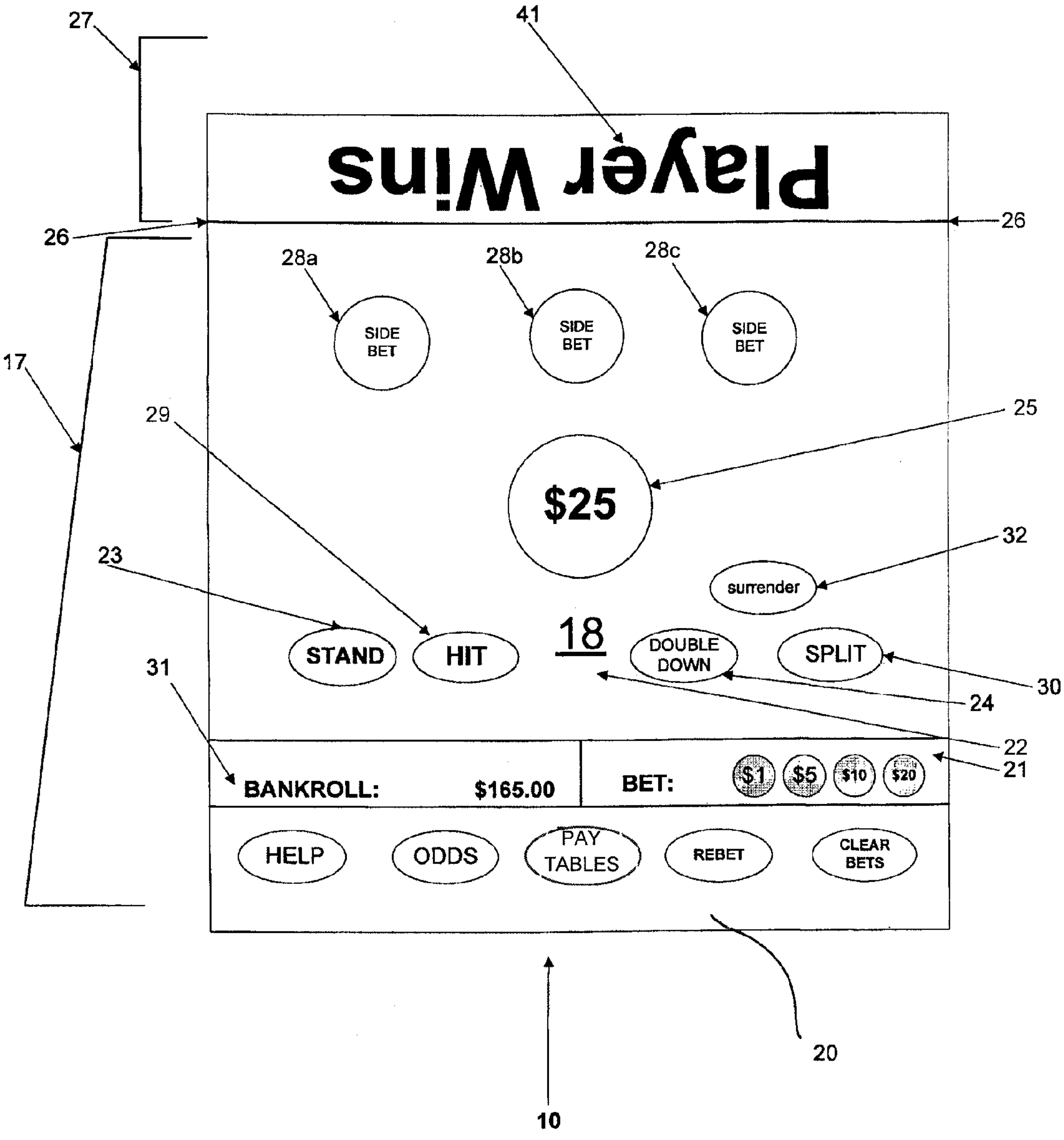
FIG. 1 shows a player display and interface with a dealer area that is displaying a player game outcome in a game of blackjack.
Figure 2:
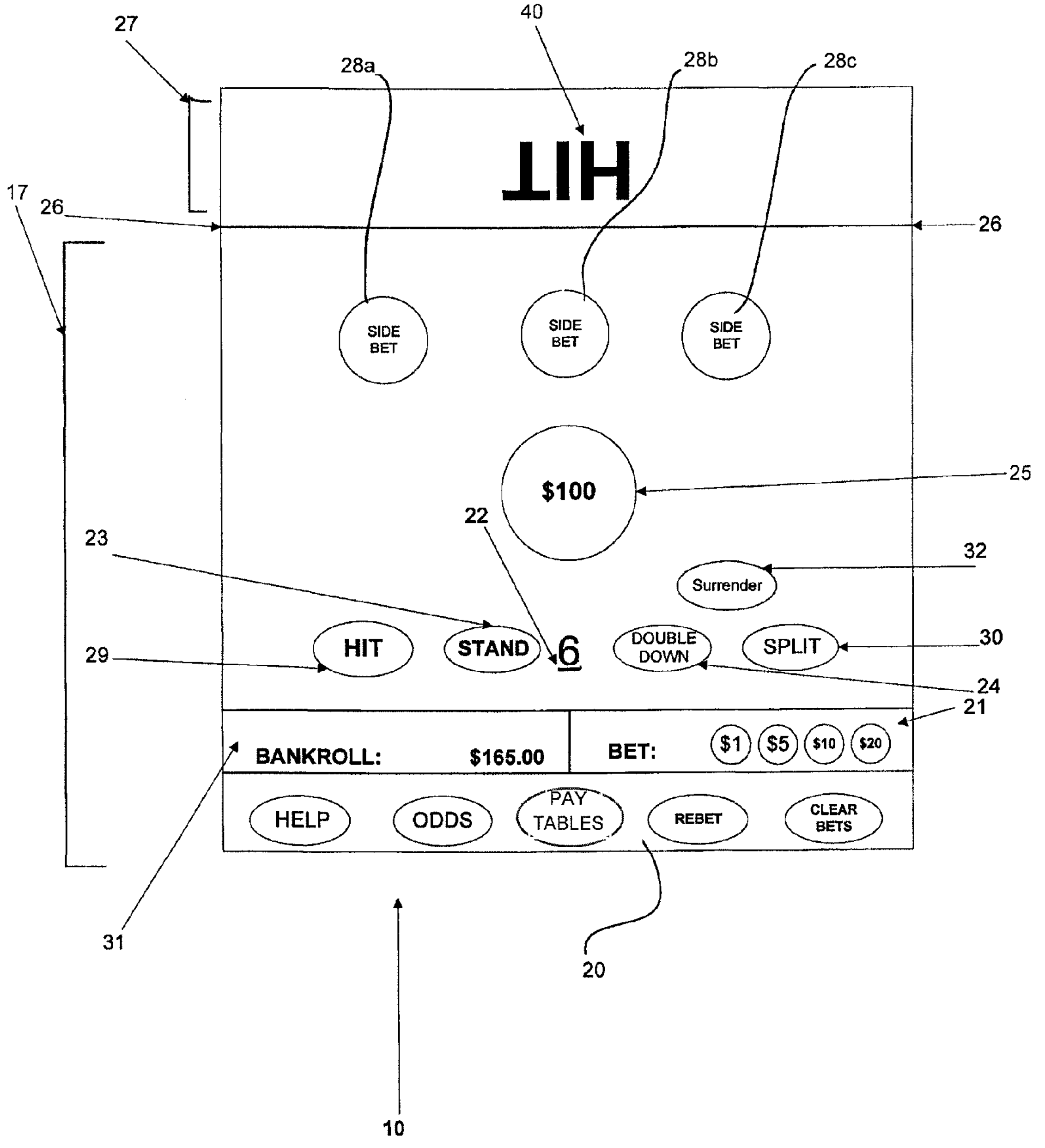
FIG. 2 shows a player display and a player play decision in a dealer area.

One preferred embodiment of the player display, as shown in FIG. 1, enables the player to input play decisions as well as wagering decisions. For example, the player area 17 of the display includes commands that are carried out by the dealer. In the game of blackjack, "stand" and "hit" instructions can be communicated via the touch screen controls to the game controller, as well as providing a visual instruction to the dealer. When the dealer responds to a "hit" command input by the player (the hit command displayed to the dealer in dealer area 27 as shown in FIG. 2), the controller receives a card rank and/or suit signal from the card-handling device (preferably a card-reading shoe), and the controller now knows that the dealt card should be associated with the hand dealt to the player position that requested the hit card. Enabling the calling of cards or commands to "split," "double-down," "hit," or "stand" similarly enables the game controller to assemble hand information and associate that hand information with a particular player display 10. The player display 10 can be equipped with a separate or integrated player tracking system (not shown) of known configurations that enable the game processor to associate win/lose information with a particular player.

The player display 10 is advantageously divided into the player area 17 and a dealer area 27. The dealer area 27 has multiple inventive functions as will be described in more detail below. In a first mode, the dealer area 27 displays a game outcome information 41 in a format that is oriented for view by the dealer. This information is used by the dealer to confirm that the player is entitled to a payout. Payouts are preferably made automatically. However, the game outcome information 41 is useful for the dealer to react positively to the player win, and encourage the player to rebet the winnings, maintaining the ambiance of a live table game experience. In a second mode, the dealer area 27 is used to instruct the dealer to take appropriate action.

Referring to FIG. 2, one possible dealer action is to deal the player a "hit" card, as shown by instruction as a player decision/action 40, such as "hit." Other instructions specific to blackjack might be to "stand," only deal "one more card" when the player doubles down, to "deal more cards" when a player has split a pair, etc. In a third mode, dealer area 27 is used to display game information or advertisements in an orientation viewable by the player. In this mode, the alphanumeric information or graphical information is oriented such that the player can readily read and/or understand the message conveyed. In a fourth mode, the dealer area 27 is touch screen enabled, providing the dealer with a means for inputting play information, such as concluding the play of a hand, activating a player display to request player commands, deactivate the player display 10, indicating the close of wagering, or other activities such as setting and rearranging hands.

In the game of pai gow poker, for example, it might be necessary to display player cards on the dealer or player areas of the display, although it is not necessary to display virtual cards in administering the game of blackjack. In the game of pai gow poker, the player's seven cards might be displayed in dealer area 27, and the dealer might be instructed to "SET HANDS." The dealer would either touch the five cards that define the high hand or the two cards that define the low hand. In one embodiment, the dealer can touch and drag cards to group them in the desired manner. In other embodiments, touching the cards defining one hand rearranges the cards on the display into set hands. The player must then arrange the physical cards to match the dealer instructions.

The touch screen is further enabled to allow the dealer to touch and drag cards from hand to hand, in the event that the dealer determines that the dealer's setting of the hand does not comply with the "house way." When the dealer area 27 is being used to instruct the dealer, the text is preferably inverted so that the information can be understood by the dealer. When the dealer area 27 is used to provide information to the player, the information is preferably oriented so that the player can readily understand the information. In one exemplary form of the invention, a split screen line 26 is provided to divide the two display areas.

An essential feature of the chipless gaming table is a player display 10 with at least one touch screen control panel overlay, or control panel. The overlay preferably extends over the entire surface of the player display 10. The player display 10 may be pressure sensitive, heat sensitive, moisture sensitive, conductive or use any other known technologies to input decisions. In other examples of the invention, the touch screen controls cover only a portion of the player display 10. The touch screen controls are configured to provide a player control area 20 for the player to make game decisions and to obtain information on how to play the game.

An exemplary player control area 20 includes a plurality of electronic buttons, for example, "help," "odds," "pay tables," "rebet" and "clear bet" buttons. The "help" button activates the display of a separate help screen that provides game rules and could offer strategic advice to the player on wagering and other game play decisions. The "odds" button displays the true odds payout for making a side bet on a particular combination of player and dealer initial cards. The true odds betting methods are disclosed in U.S. patent application Ser. No. 12/075,008, filed Mar. 7, 2008, entitled "Side Bet Odds Wagering System" and assigned to Shuffle Master, Inc. The content of this disclosure is herein incorporated by reference. The "pay tables" button activates a screen that displays the pay table or tables showing winning combinations and corresponding payout odds for the base game and/or a side bet wager or wagers. The "rebet" button allows a player to make the same size wager as made in the previous hand. The "clear bets" button resets the display so that the player can make a new wager.

The control panel includes a bankroll area 31 showing the total number of credits the player has available for play, and a virtual chip area 21 that displays the various denominations of virtual chips that can be wagered in the game.

Various decision options relative to the game rules of blackjack are located above the bankroll area 31 and the virtual chip area 21, such as, but not limited to, a stand button 23, a hit button 29, double-down button 24, a split button 30, and a surrender button 32, wherein players execute each desired game decision by using hand motions such as, but not limited to, touching and/or tapping the desired button. The player area 17 of the display in one embodiment is programmed to display the running count of the player's hand in card hand total area 22. In other embodiments, this information is not displayed.

Above the player instruction buttons (i.e., hit, stand, double-down, split, surrender, insurance (not shown), a primary wager area 25 is provided to indicate the amount of the wager. The player makes this wager by touching the $20 chip (five times) in the virtual chip area 21. The player can optionally make a number of side bets in one or more areas 28*a*, 28*b* and 28*c*. In one exemplary form of the invention, the player can change his or her bet before the close of betting by depressing the "clear bets" button on player control area 20.

At the conclusion of play, payouts may be displayed by showing virtual chips "paid out" next to the betting areas, and a meter of the bankroll area 31 is incremented with the appropriate credits. An alphanumeric "WIN" indication (not shown) may also pop up on the player display 10.

As noted, a preferred method of practice of the present technology is for the dealer area 27 or the player area 17 of the player display 10 or both segments to be provided by picture-in-picture technology, whether in analog or digital format. Circuitry and processing support systems enabling this picture-in-picture format and picture-on-picture format are known in the video monitor and electronic imaging art, such as in published U.S. Patent Applications 2008/0037628 (Boyce et al., now U.S. Pat. No. 7,573,938), 2007/0275762 (Aaltone et al.), 2007/0256111 (Medford et al.), and 2004/0003395 (Srinivas et al.).

The dealer area 27 may display a dealer instruction player decision/action 40, such as a "HIT." The player decision to hit in blackjack is input by pressing the "hit" button 29. The decision was executed after evaluating a dealt two-card blackjack hand (not shown) totaling 6 (six), the total displayed in area 22. Displaying the card count is possible when a chipless table is used in connection with a card-reading shoe or other card-reading device such as an overhead camera imaging system as disclosed in U.S. Patent Publication 2005/0272501, the contents of which is incorporated herein by this reference. The card information is sent to the game processor. The game processor calculates the hand count and transmits the count to the player display. The game processor further instructs the display to display the count in card hand total area 22.

The count in the card hand total 22 may optionally be presented on a separate upright display 330 that is double-sided with first side 332 facing toward the players (and optionally on the second side 334 facing the pit), illustrated in FIG. 11. It is important to note that the player decision/action 40 is displayed in the dealer area 27 and presented in the form of an instruction readable by the dealer (inverted, rather than in an orientation readable by the player). Since the dealer is standing and facing the players, text of the player decision/action 40 is inverted (upside down) with respect to the player's view and is easily read and/or interpreted by the dealer. The inverted text of the player decision/action 40 showing in the dealer area 27 provides the dealer with player game information as well as informs the dealer that a player decision "HIT" has been acknowledged by the system. Then the dealer must respond by taking action. The dealer area 27 clearly informs the dealer a player is requesting an additional card/"HIT" in a text and manner readable by the dealer. In response, the dealer then removes the next card from the shoe and delivers the card to the player that requested the "HIT."

As a game progresses to a conclusion, a player's final game outcome 41 (FIG. 1) shows in the dealer area 27, wherein the dealer can take appropriate action. Other information that can be shown in the dealer area 27 includes blackjack, bust, jackpot win, etc.

Figure 3:
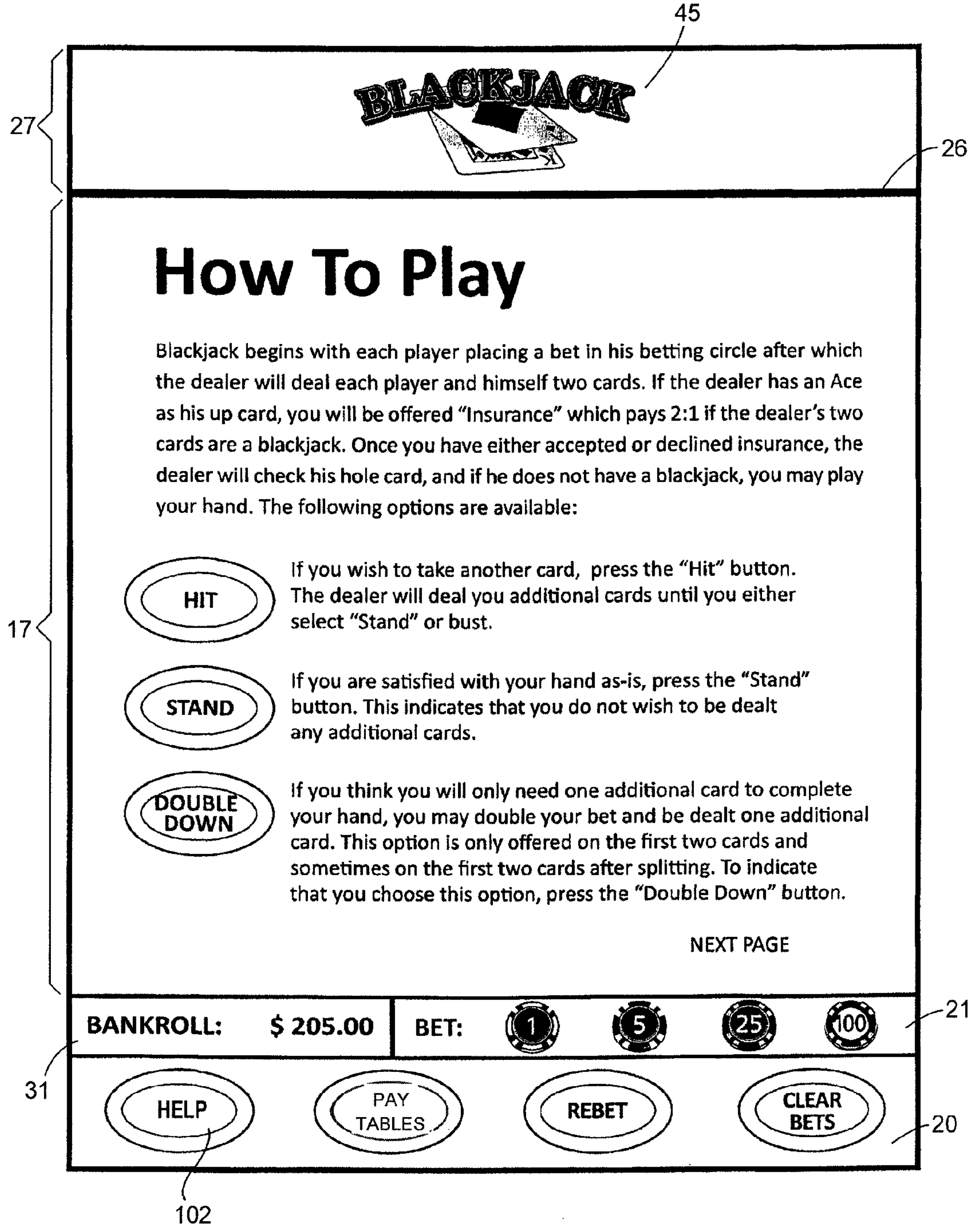
FIG. 3 shows a player display displaying available blackjack side bets in a player screen area, and an indication of a base game in a dealer area.

FIG. 3 shows an embodiment of a "How to Play" player game information screen design, wherein a player views game information in the player area 17 by pressing the "help" button 102 in the player control area 20. In this mode, it should be noted that the split screen line 26 remains displayed, and the dealer area 27 is displaying the game title/logo 45 in a text and manner readable by the player.

Figure 3A:
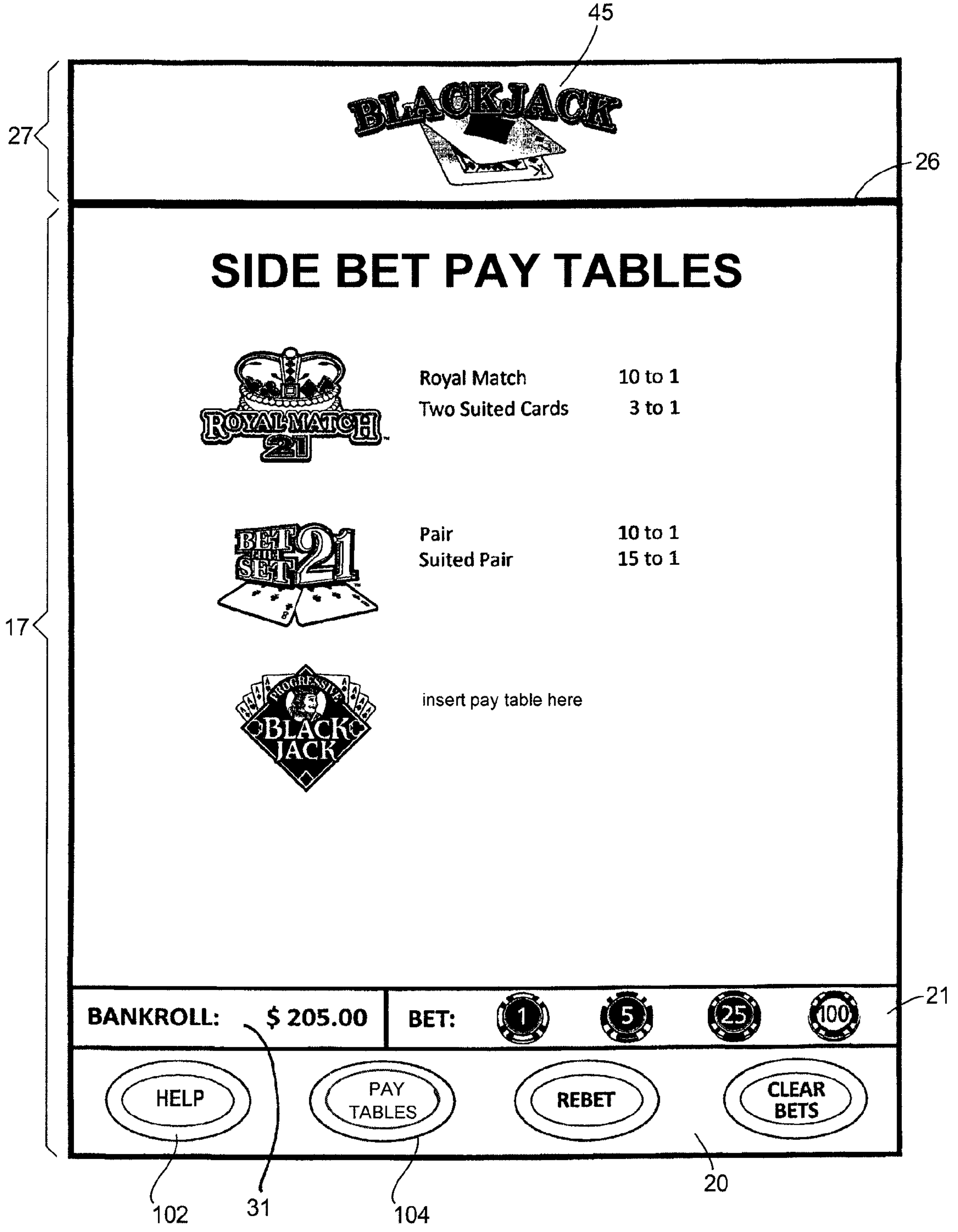
FIG. 3*a* shows a player display displaying pay tables for available blackjack side bets in the player display area.
Figure 4:
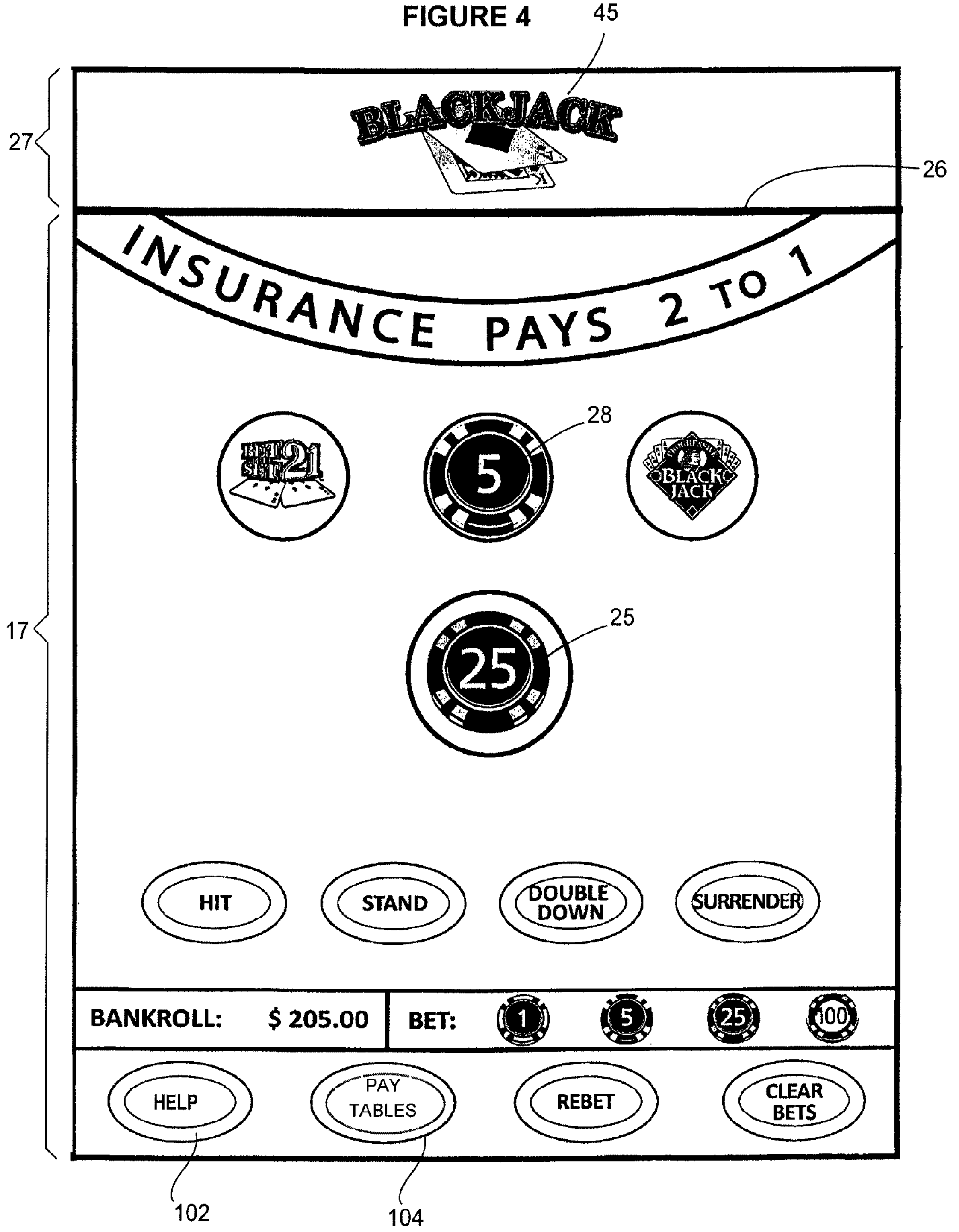
FIG. 4 shows a player display in a blackjack game after a player has placed a bet(s) and before the player has executed a game decision.

FIG. 3A shows a preferred embodiment of "Side bet Pay tables" screen format, wherein the game title/logo 45 is displayed in a text and/or manner readable by a player. It is preferable that the dealer area 27 of the display be capable of displaying information readable by the player as well as readable by the dealer in different stages of use. The side bet pay table information is accessed by a player when the pay table button 104 is touched in the player control area 20 located below bankroll area 31 and bet indicators of the virtual chip area 21. FIG. 4 shows an embodiment of a split screen after a player has placed primary wager area 25, and side bet wager 28 and before the cards are dealt. Again, it should be noted that the dealer area 27 displays the game title/logo 45 in a manner readable by the player at this stage of play.

Figure 5:
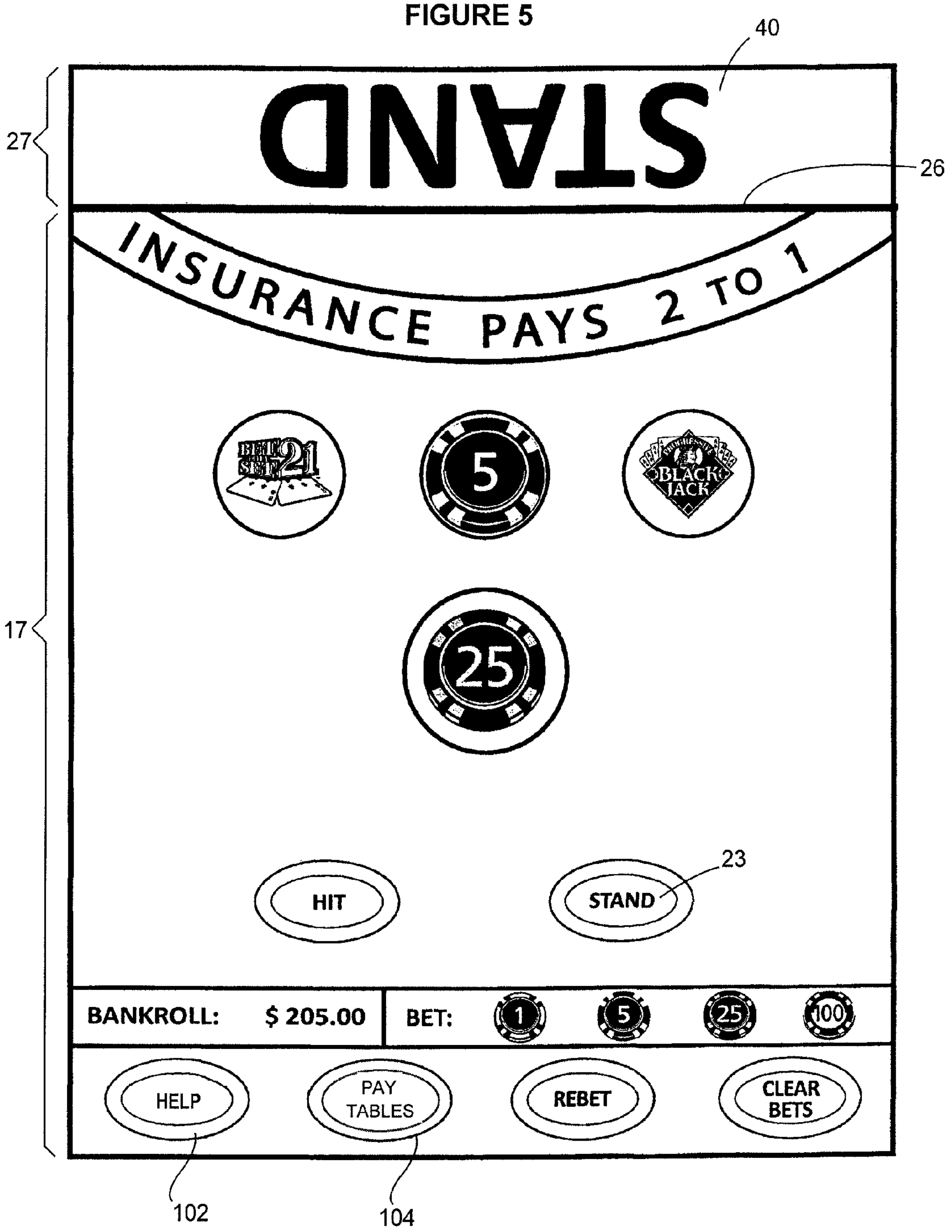
FIG. 5 shows a player display, wherein an executed player decision to "stand" is displayed in a dealer display area.

FIG. 5 shows an embodiment of a player display, wherein a player has input a "STAND" decision by depressing stand button 23 based on dealt card information. It should be noted that split screen line 26 continues to separate the player area 17 from the dealer area 27. The dealer area 27 is showing the player decision to stand 40 in substantially inverted text (upside down for the player) and in a manner easily read by the dealer.

Figure 6:
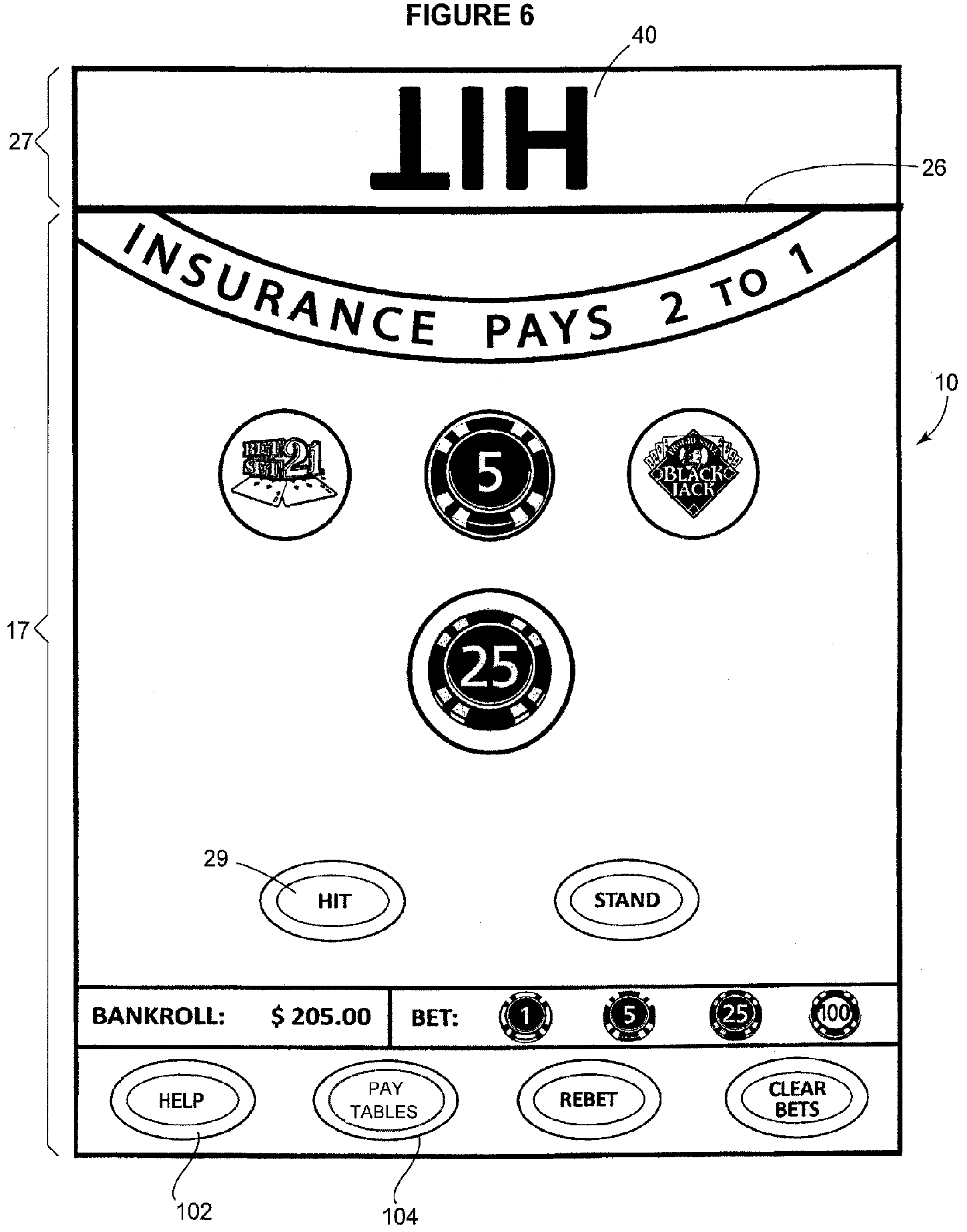
FIG. 6 shows a player display, wherein an executed player decision to "hit" is displayed in a dealer display area.

FIG. 6 shows another embodiment of the player display 10, wherein a player has input a hit decision and pressed "hit" button 29 based on dealt card information. The screen display shows the dealer area 27 is displaying the player decision/action such as "HIT" 40, in text substantially inverted in a manner easily read by the dealer. The displayed information not only indicates the player instruction to the processor, but it provides an instruction for the dealer to take appropriate action. In the case of seeing the "HIT" command, the dealer dispenses the next card to the player.

Figure 7:
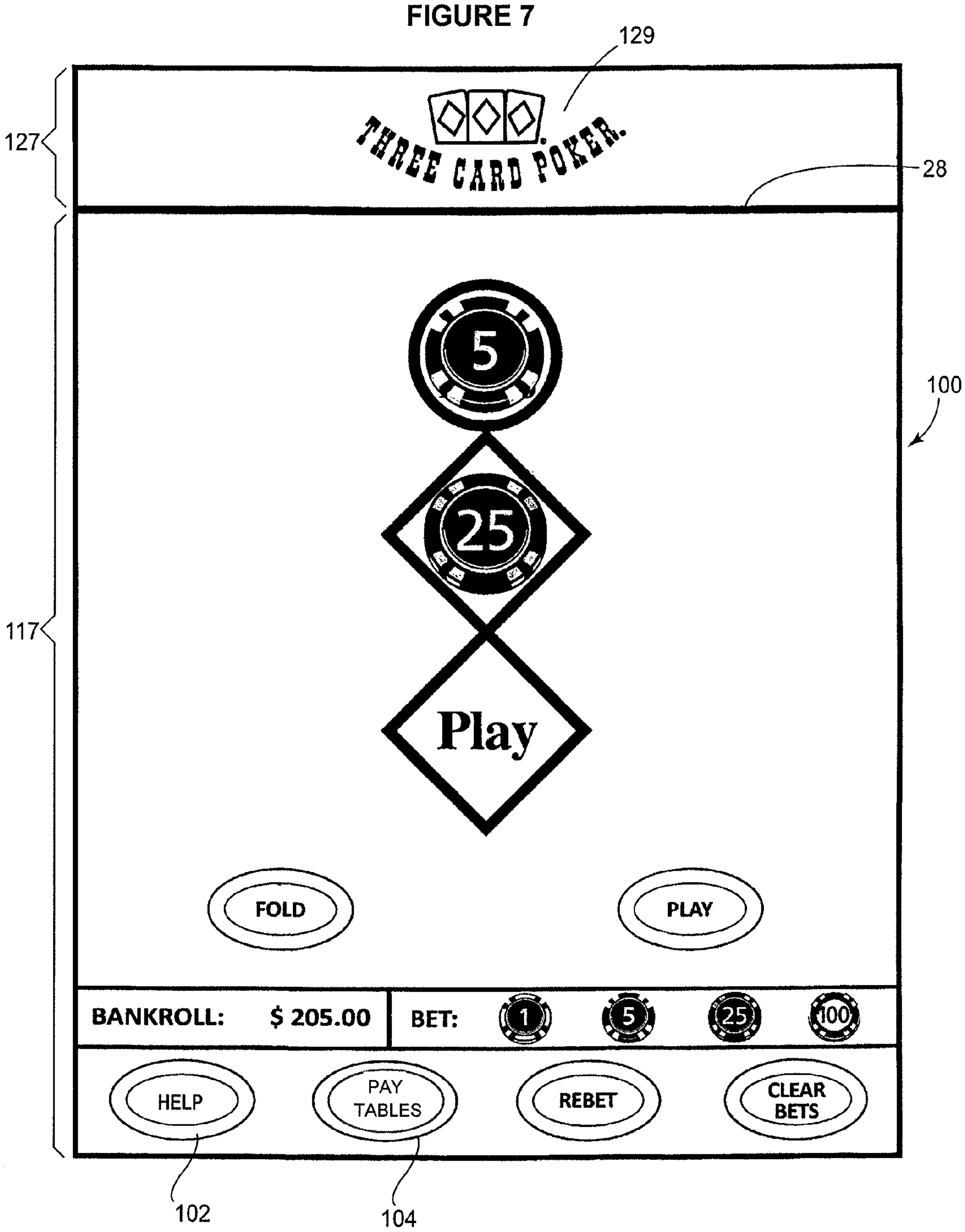
FIG. 7 shows a THREE CARD POKER® player display, wherein a player's initial wagers prior to the execution of a player game decision are displayed in a player screen area, and a game name and logo are displayed in a dealer area.
Figure 8:
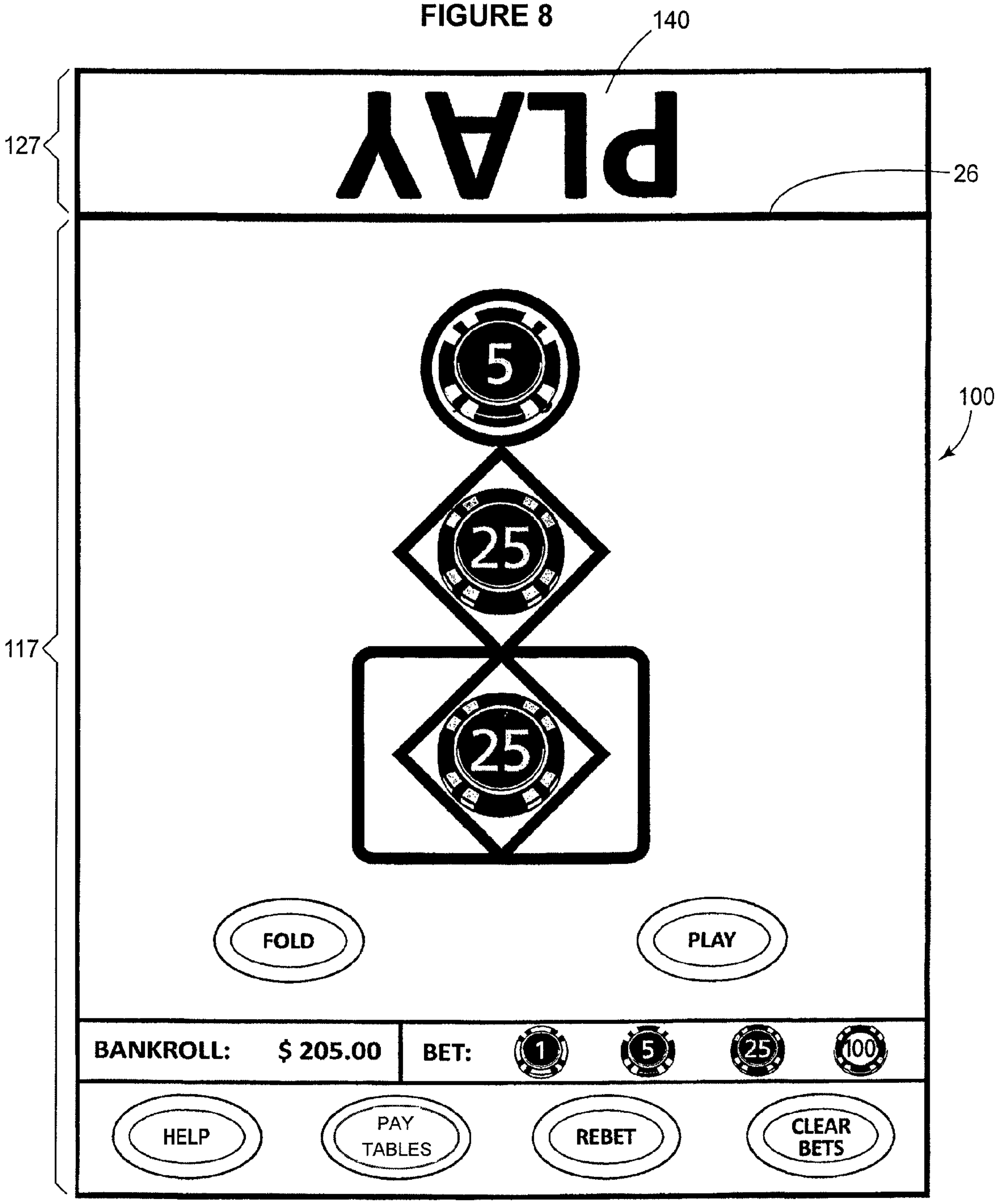
FIG. 8 shows a THREE CARD POKER® player display after a player has executed a play decision, wherein the play decision is showing in a dealer area.
Figure 9:
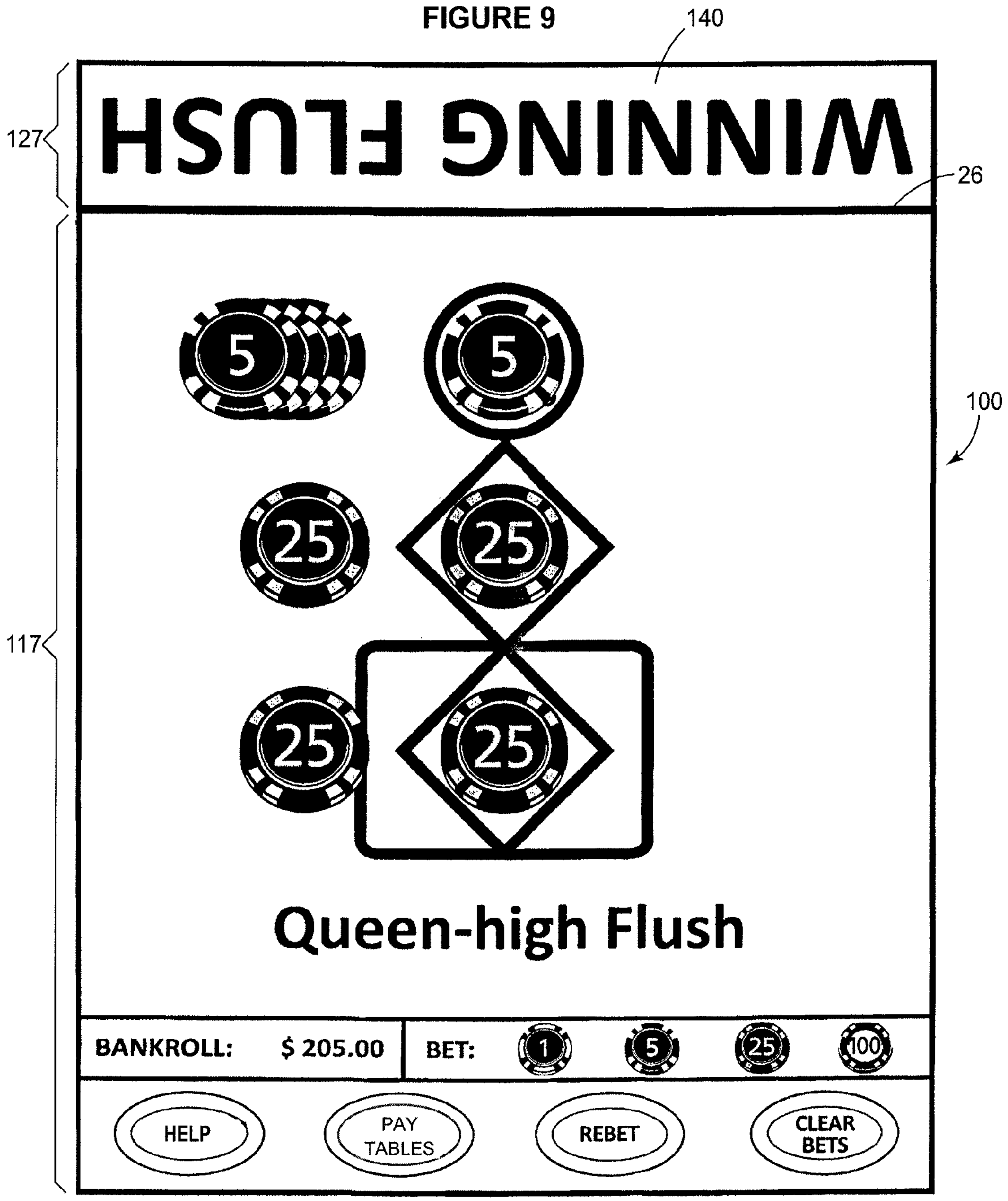
FIG. 9 shows a THREE CARD POKER® player display showing a player's game outcome, wherein the player's game outcome is also showing in a dealer area.
Figure 10:
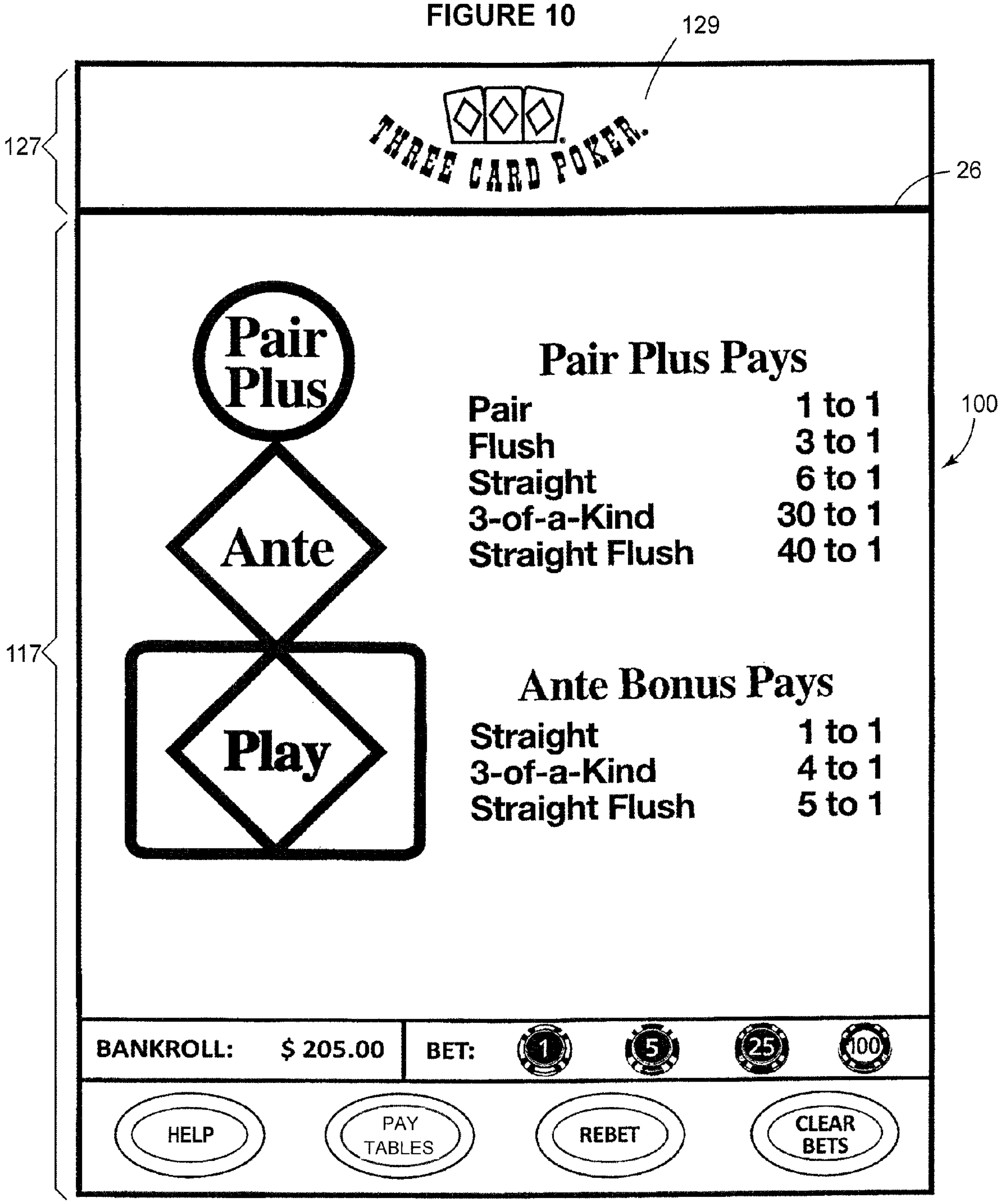
FIG. 10 shows a THREE CARD POKER® player display showing the THREE CARD POKER® "Pair Plus" and "Ante Bonus" pay tables, wherein the pay tables are showing in a player area, and a game name and logo is displayed in a dealer area.

FIGS. 7, 8, 9, and 10 show exemplary split screen displays for the THREE CARD POKER® game, wherein the game display, game options and betting areas differ according to the rules of THREE CARD POKER®. The player display 100 includes a player play area 117 as well as a dealer display area 127. As shown in FIG. 7, the dealer display area 127 is displaying the game logo 129, arranged to be viewed by the player. As in the previous embodiments and as shown in FIG. 8, when intended to provide the dealer with instructions to facilitate play, the instruction text 140 in the dealer display area 127 is displayed in a manner easily interpreted by the dealer. Prior to a player game decision and/or the start of a game, the dealer display area 127 displays the game logo and/or game name in a manner readable by the player.

The system comprises a gaming table having at least:

a. a player station having a data entry (e.g., touch screen) capability and preferably an independent graphics processor;

b. a central CPU controlled by the dealer or house;

c. a communication link between each player station and the central CPU;

d. a card delivery system (e.g., delivery shoe with card reader, card shuffler with card reader, or manual shoe with overhead camera imaging) that provides rank/count/suit type information on cards delivered, and e. A dealer input, preferably in the form of a dealer display with touch screen controls.

Although it is not necessary to provide touch screen controls at the player or dealer stations, this type of user input is desirable because it can be reconfigured through reprogramming and no hardware components must be changed out to reprogram the system to administer different games.

After all bets are placed, the dealer may touch a "deal" field on the dealer's screen. This prevents all entered bets from being changed, and locks out all new bets. The dealer may then begin to deal (by either removing the first card from the dealing shoe or pressing a switch on a shuffler for dispensing a hand of cards). In one embodiment, once the first card is dealt, a plurality of new fields appears on each player's touch screen.

Different communication and control relationships can exist between player input systems, game controllers, casino computers, databases, and data storage media within a single casino or multiple casinos. The relationships are known within the Communication-Information Technologies field as master-slave systems, thin client systems, client server systems and blended systems. The blended system is understood to be a system that is not fully master-slave, where a single dominant computer gives orders/commands to a slave subordinate computer or processor or purely input system (e.g., buttons only, cash input, and information signals only, without substantive commands being sent, and the like), nor is it a completely or substantially coequal system (peer-to-peer) where data processing and commands may be performed by multiple systems (multiple computers) with defined regions of control and authority. These differing relationships are contemplated by the present invention. In one exemplary form, the graphics functions are managed by the player processor, and all other functions are managed by the game CPU.

Underlying Architecture for Chipless Gaming Tables

FIG. 11 shows an exemplary chipless gaming table of chipless gaming system 200 for playing live card games with physical playing cards (e.g., playing cards 206*a* and 206*b*) according to technologies enabled and disclosed herein. The chipless gaming table of chipless gaming system 200 can be of a variety of common constructions or configurations as are typically used as structural components of gaming tables in the industry. The typical gaming table has a tabletop or playing surface 204 and a perimeter pad or armrest 208, which extends at least about the portion of the table periphery facing players. The relatively straight back portion of periphery 210 is used by the dealer (not shown) and can be partly or wholly padded as may vary with the particular table chosen. Seven player display/input systems 212*a*-212*g* are shown. Each of the player display/input systems 212*a*-212*g* has an individual processor 214*a*-214*g* (shown in phantom) and a player touch screen 216*a*-216*g*. There may be an optional dealer chip tray 220 (e.g., chip rack). There is also a game controller, CPU or casino computer 228 (shown in phantom) whose location at the chipless gaming table of chipless gaming system 200 is relatively unimportant, but which must be in direct (hard-wired or wireless or networked) communication with each player individual processor 214*a*-214*g* and a card-reading and/or delivery system 222 from which playing cards are supplied, with at least the rank/count (and preferably also suit) of individual cards known as the cards are removed (for example, one at a time) and delivered to player positions and/or the dealer position. The card-reading and/or delivery system 222 is in communication with controller 228 by wired or wireless communication methods. The individual processors 214*a*-214*g* could also be in communication link with the game controller 228 (e.g., CPU, casino computers, etc.) by wireless or hardwired connections. Communication is not limited to electronic or electrical signals, but may include optical signals, audio signals, magnetic transmission or the like.

The tabletop or playing surface 204 is provided on the chipless gaming table of chipless gaming system 200 where participants of the card game(s) play. One or a plurality of players (not shown) sit or stand along the semicircular portion and play a desired card game, such as the popular casino card games of blackjack, baccarat, poker and poker variants. Other card games are alternatively possible, although the system described will be discussed with respect to the play of blackjack.

The chipless gaming table of chipless gaming system 200 also advantageously includes a betting chip rack 220 that allows the dealer to conveniently store betting chips used by the dealer in cashing players in and out of the game. A money drop slot (not shown) is further included to allow the dealer to easily deposit paper money bills thereinto when players purchase credits.

The chipless gaming table can support a system, or form a part of a system, for playing live card games, which is constructed according to the present invention. The chipless gaming system 200 described herein in one example of the invention is a retrofit system that has been added to a standard gaming table support frame. Such a retrofit system includes an upright display 330 that is double-sided, which displays images that depict game information such as pay tables, hand counts, win/lose information, historical won/lost information by player, and a wide variety of other information considered useful to the players. The upright display 330 is a double-sided display that will be explained more fully below.

The system also preferably includes a dealer console 218, which is preferably provided in the form of a display with touch screen controls positioned within the chip rack 220. In an alternate embodiment, the dealer control resides on the card-reading and/or delivery system 222 or as a separate keypad (not shown). Individual player position processors 214*a*-214*g* are preferably graphics processors and not full content CPUs as a cost saving, space saving, and efficiency benefit. With the reduced capacity in the processor as compared to a CPU, there is actually reduced likelihood of tampering and fraudulent input.

The individual components provided for functionality at each position (e.g., the slave, servant, coequal, or master functionality) are not limited to specific manufacturers of formats, but may be used according to general performance requirements. It is not even necessary that identical computing formats (MAC, PC, LINUX®, etc.) be used throughout the system, as long as there is an appropriate I/O communication link and language/format conversion between components. Further discussion of the nature of the various components, including definitions therefor, will be helpful.

Flash memory (sometimes called "Flash RAM") is a type of constantly powered non-volatile memory that can be erased and reprogrammed in units of memory called "blocks." It is a variation of electrically erasable programmable read-only memory (EEPROM) that, unlike Flash memory, is erased and rewritten at the byte level, which is slower than Flash memory updating. Flash memory is often used to hold control code such as the basic input/output system (BIOS) in a personal computer. When BIOS needs to be changed (rewritten), the Flash memory can be written to in block (rather than byte) sizes, making it easy to update. On the other hand, Flash memory is not useful as random access memory (RAM) because RAM needs to be addressable at the byte (not the block) level. Flash memory gets its name because each microchip is organized so that a section of memory cells are erased in a single action or "Flash." The erasure is caused by Fowler-Nordheim tunneling in which electrons pierce through a thin dielectric material to remove an electronic charge from a floating gate associated with each memory cell. The Intel Corporation (Santa Clara, Calif.) offers a form of Flash memory that holds two bits (rather than one) in each memory cell, thus doubling the capacity of memory without a corresponding increase in price. Flash memory is a non-volatile computer memory that can be electrically erased and reprogrammed. It is a technology that is primarily used in memory cards and USB Flash drives (thumb drives, handy drives, memory sticks, Flash sticks, jump drives, currency sensors, optical sensors, credit entries, and other signal generators) for general storage and transfer of data between computers and other digital products. It is often considered a specific type of EEPROM (Electrically Erasable Programmable Read-Only Memory) that is erased and programmed in large blocks; in early Flash, the entire chip had to be erased at once. Flash memory has also gained popularity in the game console market, where it is often used instead of EEPROMs or battery-powered SRAM (Static Random Access Memory) for game save data.

The phrase "non-volatile" means that it does not need power to maintain the information stored in the chip. In addition, Flash memory offers fast read access times (although not as fast as volatile DRAM memory used for main memory in PCs) and better kinetic shock resistance than hard disks. These characteristics explain the popularity of Flash memory in portable devices. Another feature of Flash memory is that when packaged in a "memory card," it is enormously durable, being able to withstand intense pressure, extremes of temperature, and immersion in water. Although technically a type of EEPROM, the term "EEPROM" is generally used to refer specifically to non-Flash EEPROM, which is erasable in small blocks, typically bytes. Because erase cycles are slow, the large block sizes used in Flash memory erasing give it a significant speed advantage over old-style EEPROM when writing large amounts of data. Non-volatile memory (NVM) or non-volatile storage is computer memory that can retain the stored information even when not powered. Examples of non-volatile memory include read-only memory (ROM, Flash memory, most types of magnetic computer storage devices, e.g., hard disks, floppy disk drives, and magnetic tape) and optical disc drives. Non-volatile memory is typically used for the task of secondary storage or long-term persistent storage. The most widely used form of primary storage today is a volatile form of random access memory (RAM), meaning that when the computer is shut down, anything contained in RAM is lost. Flash memory may also be provided in chips, field-programmable gate arrays (FPGAs), ASICs and Magnetic RAM (MRAM). The latter allows for computers that could be turned on and off almost instantly, bypassing the slow start-up and shutdown sequence.

The "chipless table" format and architecture described herein comprises generic concepts and specific disclosure of components and subcomponents useful in the practice of the present technology. It should be appreciated at all times that equivalents, alternatives and additional components, functions and processes may be used within the system without deviating from the enabled and claimed technology of this invention.

One preferred construction of a chipless table has from three to eight players (shown in FIG. 11 as seven player positions) with five, six or seven player display/input systems 212*a*-212*g* (with individual processors 214*a*-214*g*) being preferred, a dealer console 218, a table sign (shown in FIG. 11 as upright display 330 that is double-sided, with a first side 332 that is directed toward players and a second side 334 that is directed toward the pit). A card-reading and/or delivery system 222 (or card-reading shuffler or overhead camera imaging system or table-mounted card reader) (not shown), a dealer chip tray 220, playing cards 206*a*, 206*b*, a generic felt 336 and a casino computer 228 using the AQUARIUS CONTROLLER™ protocol (under-the-table game controller manufactured by Progressive Games, Inc. of Las Vegas, Nev.), for example.

The game information (which is preferably for multiple games) is configurable and will be set up during the initial installation of the table and may be switched from game to game on-the-fly at each table. It is from this setup that the game information is selected so that the graphics on the player touch screen 216*a*-216*g*, dealer console 218, second side 334 of upright display 330 and first side 332 of upright display 330 provide the correct information regarding the game in play. It is the capability of changing individual types of game events (e.g., from blackjack to baccarat) at a table that enables, or even requires, that the generic felt 336 is free of any permanent printing that identifies only a specific game at a table. There may be separate monitors (not shown) that enable display of game names, game rules and pay tables for individual games, or under-table back-lighting that may project such information display on the table. It is important to note that the dealer display area 127 (shown in FIG. 7) of each player screen is capable of displaying the game name and logo when the area is not being used to provide game information. By displaying the game name and logo information in dealer display area 127, it is not necessary to print the same information on the generic layout 336.

Using the second side 334 of upright display 330 that is directed toward the pit, the game is selected by casino personnel and communicated to the game controller 228 via a touch screen control on the second side 334. The game controller 228 (and/or a central pit controller) sends out the appropriate graphics to each of the player screens and table display signs to begin game play.

One example for the basic procedure for game play is:

1. A player buys in with either cash, chips, tickets, electronic access to an account, credit card, marker, and the like.
2. The dealer adds credits to a player position using the dealer console.
3. Wagers are made electronically using the touch screen controls at each individual player position. Touch screens may be of any convenient size considering ease of viewability by players, space limitations on the table and ergonomics, and, for example, may be between about 4 inches and 15 inches at each player position (diagonal measurement).
4. All initial wagering (e.g., antes, initial bonus wagers, initial jackpot wagers, initial mandatory wagers) is stopped when the first card or hand is delivered. Delivery may be from the shoe or shuffler. This stopping may be effected by a signal from the shoe or shuffler (to the game processor/table computer) that actual play of a round of the underlying game has been made. Subsequent wagers (such as splitting events, double-downs, secondary wagers, play wagers, etc.) may be made in a controlled manner by the system. Player decisions are input by players using the player input areas and instructions are provided in alphanumeric or graphical form to the dealer on the dealer display area 127 of the player display.
5. The underlying game is played as normal, with physical cards being provided and all wagers and resolutions of wagers being made on the electronic wagering system. (Note: The touch screen procedures and graphics for each game usually will be different, and table play for each game will be provided, controlled, enabled and directed by the game processor/table computer).
6. Upon hand or game completion, wager reconciliation is initiated, either by the dealer (e.g., specifically inputting a signal or command by button or dealer area of the player display using a touch screen or other input) or automatically by the system (that has determined by card-reading events that a round or game has ended) and is reflected as an increase, no change (push) or decrease in the bankroll on the player's screen.

7. When a player leaves the table, credits are removed from the player position through the dealer console 218 and the credits are paid out with chips, tickets, or cash, or credits are transferred to a player account from the dealer console 218.

In one embodiment, the table has reporting functionality, such as reports that are specific to the table and recorded by pit personnel on a regular basis. This data can be accessed on 15-inch pit display touch screen on, for example, the second side 334 of upright display 330. The raw data from the chipless gaming table of the chipless gaming system 200 can be packaged and sent to a central pit or house computer for analysis (player ratings, dealer efficiency, table handling, etc.).

Dealer Console

An example of properties that would be available in a dealer console 218 should be able to perform the following actions:

- Buy in and cash out of players on the table;
- Notifies the dealer if a player chooses to cash out;
- Enables and disables player touch screens;
- Move credits if a player chooses to change seats;
- Allows dealer log-in/log-out on the table;
- Informs the dealer (initially only is desirable, although the alert may be triggered and waited for until after players' further wagering) if the dealer has a blackjack (i.e., "no peek" function); and
- Reconciles the wagers when the hand is complete when the dealer presses the "Reconcile" button on the touch screen.

The CPU/Game Controller/Table Computer

Preferred functions of the game controller 228 are as follows:

- Stores game information;
- Manages the player terminals;
- Controls the one-way or two-way (e.g., 10-inch or 20-inch) table sign with pay tables, game information, progressive amount, etc.;
- Controls the pit sign with game setup options, table statistics, etc.;
- Controls the player buy-in process through communication with the player input system;
- Controls player cash-out process through communication with the player input system;
- Records wagers made at start of a game;
- Prevents betting after the first card is dealt (except as additional wagers are allowed during play of various games, but then only limited wagers and specific wagers);
- Receives card and/or hand information from the shoe, shuffler, overhead camera imaging system or table-mounted card reader;
- Evaluates player bets;
- Automatically pays the wins and collects losing bets;
- Enables specifically identified betting after the hand for the player terminal has been resolved;
- Interfaces to the optional jackpot system; and
- Provides touch screen resolution of events and games.

Player Displays

The Player Touch Screen (or PTS) is, for example, a 10.5-inch touch screen with an attached processor board. The player uses the PTS to make wagers and to communicate game actions to the dealer and to record game play events. The top section of the touch screen (relative to the player) is split and graphics are reversed at certain stages of use for the dealer to know what action the player is taking and to receive instructions to take action requested by the player. Certain considerations should be made on the design to include the following:

Placement of the displays in the table should be flush (or very close) and the touch screen bezel should be minimal. This will minimize card edges snagging and getting stuck when dealt and pulled toward the player. It is actually better to have the screen slightly elevated above the plane of the table top (e.g., the felt cover or other surface), as it is easier to slide cards along a raised edge than to lift the cards out of a depression.

Other desirable features are listed below:

- Easy replacement of player terminals when broken;
- Graphics must be easy to understand for the patrons;
- Help screens should be available and accessible on demand;
- The functions of the player touch screen include:
  - Provide the player with their bankroll amount;
  - Allow the player to wager, increase or decrease a wager;
  - Allow a player to repeat the previous wager with a single button press;
  - Notify the dealer if the player would like to cash out;
  - Record player actions during the game (for example, hit, stand, double-down, etc.);
  - Report player actions to the dealer via the split screen; and
  - Touch screen resolution—all alphanumerics should be easily readable by players and dealers at a distance of three meters or more.

Upright Display

Description:

The upright display 330 is a two-part system comprising a first side 332 directed toward players and a second side 334 directed toward the pit. These parts are combined in one embodiment into a double-sided display, vertically mounted above the surface of the table. That is, two screens are placed back-to-back, one facing the pit and one facing the player. First side 332 may be an LCD screen (or other display screen) facing the table for player information. It may or may not be a touch screen. The second side 334 in one example of the invention is a touch screen that allows for pit interaction with the table to include game selection and pit reports. In other embodiments, the pit can input information via a keyboard that communicates with the game controller 228 or directly with the second side 334 of upright display 330.

Communal Player Display

As an example, a 15-inch first side 332 of upright display 330 is mounted facing the players on the table in the manner shown in FIG. 11. This display is used to provide information that normally would have been printed on the felt (game, table rules, pay tables, game name, casino logo, legal markings, etc.). It also can include information on a progressive jackpot, casino advertising, or any information that the casino may want to provide to a player.

The table display functionality shall include, for example:

- Providing game name and applicable rules;
- Display game pay tables;
- Provide progressive jackpot information;
- Identify winning players;
- Allow casino advertising; and/or
- LCD (or other display) resolution should be easily readable by players and dealers at a distance of three meters or more.

Pit Display

Description:

For example, a 15-inch pit touch screen is mounted facing the pit. The display is used to provide information to a pit supervisor regarding the table. The touch screen allows for initial set-up, game selection and pit reports. Alternatively, data is input through a keyboard in the pit and is displayed on the upright display, which is double-sided.

The pit display functionality includes, for example:

Initial game set-up and game options;

Select games;

Open and close the table;

Set table minimum and maximum bet limits; and/or

Interface to the optional jackpot system.

Shoe/Shuffler

Description:

The shoe/shuffler or card delivery system must be able to provide the function of electronically identifying the cards that are delivered. Examples of suitable card delivery systems are described in U.S. Patent Publication 2006/0279040, published Dec. 14, 2006, entitled "Manual Dealing Shoe With Card Feed Limiter"; U.S. Pat. No. 8,070,574, issued Dec. 6, 2011, entitled "Apparatus, System, Method, and Computer-Readable Medium for Casino Card Handling with Multiple Hand Recall Feature"; and U.S. Pat. No. 7,374,170, issued May 30, 2008, for "Playing Card Dealing Shoe With Automated Internal Card Feeding and Card Reading." The disclosures of these publications are incorporated by reference in their entireties. The card delivery device may read cards internally and then deliver cards one at a time or in sets of cards, with the identity of the individual cards (and all cards in sets), or read cards one by one as they are removed from the delivery system and forward that information to the table game controller. With card-reading technology on the table, combined with the wagers and player actions, the game can be re-created for player analysis and game tracking.

The card delivery system selected in some embodiments have a "chipless" mode in which the unit accepts commands from the game controller through an I/O port, such as a USB port or cable entry or pinned connection or preferably a wireless network access.

The card delivery system functionality for the chipless table may include:

Communicate to the game controller when the first hand or card is pulled for the game controller to lock out the bets on the player touch screens;

Accurately recognize the rank and suit for each card; and/or

Report the card information to the game controller.

Other systems such as the overhead card-imaging systems described above or table-mounted card readers are other exemplary sources of card rank and/or suit information.

Gaming Table Requirements

When installing the product, the system preferably provides a tabletop structure with all electronics embedded within a layered tabletop. This layered tabletop can be built in a factory and installed on a preexisting support surface such as conventional "H" legs or a crescent-shaped cabinet. The system preferably includes instructions for mounting the tabletop onto the support structure. There may be instances when the player display is mounted closer to the dealer. In this embodiment, all system components are essentially the same as described above, except for the placement of the player displays on the table. Moving the displays closer to the dealer is desirable when the dealer must input information into the dealer portion of the screen, such as when the dealer sets a pai gow poker hand, or indicates the conclusion of play for a particular player, for example.

The tabletop should be covered with plain felt (no printing indicative of only a single game). Printing may be present identifying the casino, sponsors, events, and other information that is not specific to a single game or multiple games. This will allow the operator to change the game in play quickly without changing the table felt.

Allowances should be made for drinks at the table. This should require a high degree of water resistance against spilled drink penetration around the edges of the monitor. This may be done by sealant and/or tight mounting that does not allow liquid penetration. Grooves receiving the screen and overlapping, tight-fitting elements will reduce liquid penetration to enable wiping to prevent rapid significant penetration and damage. It would also be desirable to use player screen/processor units that are liquid tight.

Consideration should be given to how quickly a player touch screen can be replaced in the event that one is damaged. The use of modular screens with modular processors can assist in effecting this benefit.

Optional Multi-Table Pit Computer

Description:

The pit computer gathers the data from multiple tables and stores the information in a database for use by the casino for player analysis, table accounting, etc.

The functionality might include, for example:

Hosting the database for the table; and

Optionally used to host the jackpot system.

Player/Dealer ID Card-Reading System

Description:

The card reader is an add-on that may be used by the dealer, the pit and/or players. Dealers and pit personnel may use cards to authorize play at the table. The card reader can also be used to accept player tracking cards.

Felt Backlight Display (Optional)

Description:

Backlighting under the felt is used to define the areas of the table where cards should be placed by the dealer.

User Interface Graphics

Standards may be summarized at least as follows:

Game-specific graphics: The graphics that are specific to a game shall be selected by the game designer.

Dealer Console—Dealer

The general user interface screens for the dealer console shall include:

Player buy-in using cash, chips or a marker;

Issue a marker;

Player cash out;

Player seat change;

Game screens;

Game controller—pit display:

- Game selection;
- Pit reports; and
- Table handle.

Player Touch Screen

Player terminal inactive; and

Wagering screen.

Hardware Interface

The hardware interface used in communication linkage of the components may be any architecture used to interconnect two pieces of equipment. It includes the design of the plug and socket, the type, number and purpose of the wires and the electrical signals that are passed across them. USB, FIREWIRE®, Ethernet, parallel and serial ports, as well as COMPACT FLASH® cards, PCI cards and PC cards, are all examples of hardware interfaces (devices connecting to other devices). As noted, wireless communication between elements is generally preferred.

Software Interfaces

Any functional and established software interface may be used, such as selecting those from amongst the ANSI Standard, ISO/IEC Standards, and IEEE Standards. There are well-published lists of these standards and include at least:

IEEE Standards

IEEE 694-1994: Microprocessor Assembly Language.

Defines a common assembly language intended to be used for a variety of microprocessor architectures.

IEEE 695-1990: Microprocessor Relocatable Software Formats.

Defines a common format for object files in a small computer environment. The purpose is to enable program construction from modules written in different languages and processed by different compilers.

IEEE 754-1990: Binary Floating Point Arithmetic.

Defines binary formats and basic operations for floating-point arithmetic. This is commonly referred to as an "IEEE floating point" and has become widely adopted in new system implementations.

IEEE 770-1983 (ANSI X3.97): Pascal Computer Programming Language.

Provides a formal specification for Pascal, the first language standardized by IEEE.

IEEE 854-1994: Radix and Format Independent Floating Point Arithmetic.

Specifies alternate floating point arithmetic formats and operations for implementations that do not necessarily use base 2.

IEEE 855-1990: Microprocessor Operating System Interfaces (MOSI).

Defines a standard OS/program interface (API) for small computers, commonly known as MOSI. Compared to the better-known POSIX (1003), MOSI is less detailed but spans a broader range of target systems. Includes language bindings for FORTRAN, C, Ada, Pascal, and others as appendices. Also, ISO DIS 11685.2.

IEEE 1003.1-1990: POSIX Part 1: System API (Language Independent).

Definition of a standard OS/program interface, commonly known as POSIX, for UNIX-like systems. Includes language bindings for C, only, and also ISO 9945-1.

IEEE 1003.1b-1993: Real-Time and Related System API.

Specifies additions to the POSIX API to support real-time requirements.

IEEE 1003.2-1992: Shell and Utility Application Interface.

Defines functionality for a UNIX-like shell (command handler) and associated tools.

IEEE 1003.9-1992: Fortran 77 Language Bindings to POSIX.

Specifies the syntax for accessing the functionality of a POSIX interface using the FORTRAN language.

IEEE 1224-1993: OSI Abstract Data Manipulation API.

Specifies an API for Abstract Data Manipulation using the OSI (7-layer) Communication Systems model.

IEEE 1224.1: OSI X-400 Based Electronic Messaging API.

Specifies an API for Electronic Messaging Services using the OSI model.

IEEE 1224.2-1993: Information Technology: Directory Services API.

Specifies an API for Directory Services using the OSI model.

IEEE 1275-1994: Boot Firmware.

Defines elements of program functionality to be used in boot (startup) programs in read-only memory.

IEEE 1327-1993: OSI Abstract Data Manipulation C Language Binding.

Specifies a C Language Binding for IEEE 1224.

IEEE 1224.1: Information Technology: X-400 Based Electronic Messaging C Language Binding.

Specifies a C Language Binding for IEEE 1224.1.

IEEE 1224.2-1993: Directory Services C Language Binding.

Specifies a C Language Binding for IEEE 1224.2.

IEEE 1596-1992: Scalable Coherent Interface.

Specifies a physical interconnection scheme for multiprocessors, including aspects that affect their programming.

Computer-related (Information Processing) standards sponsored by the American National Standards Institute ("ANSI") are developed primarily by the Accredited Standards Committee X3. These standards are designated X3.nnn.

ANSI Standards

ANSI X3.4-1986: 7-bit American National Standard Code for Information Interchange Base definition for the widely used character code known as ASCII.

ANSI X3.9-1978(R1989): Programming Language FORTRAN

Third revision of the first and most venerable programming language standard.

The 1978 version, called FORTRAN-77, is widely implemented. The 1989 version, called FORTRAN-90, is not yet as popular.

ANSI X3.23-1985: Programming Language COBOL

The widely used business-oriented language.

ANSI X3.23a-1989, Programming Languages—Intrinsic Function Module for COBOL.

Extensions to the COBOL standard.

ANSI X3.28-1976(R1986): Procedures for the Use of the Communications Control Characters of American National Standards Code for Information Interchange in Specified Data Communication Links Provides interpretations for the ASCII communication control characters.

ANSI X3.30-1985(R1991): Representation for Calendar Date and Ordinal Date for Information Interchange Specifies how date information should be represented for data exchange.

ANSI X3.41-1990: Code Extension Techniques for Use with the 7-byte Coded Character Set of ASCII Specifies how the ASCII code may be extended.

ANSI X3.43-1986: Representations of Local Time of Day for Information Interchange Specifies how time information should be represented for information interchange.

ANSI X3.51-1986: Representations of Universal Time, Local Time Differentials, and United States Time Zone References for Information Interchange Specifies additional time-related information representations.

ANSI X3.53-1976(R1987): Programming Language PL/I.

Specification for the PL/I language used primarily on IBM systems.

ANSI X3.64-1979(R1990): Additional Controls for Use with the American National Standard Code for Information Interchange Specifies a large collection of ASCII extensions to control display and printer functionality. In practice, a small set of screen-editing and cursor-positioning codes have been widely adapted; these are supported by so-called ANSI terminals.

ANSI X3.74-1987: Programming Language PL/I, General Purpose Subset

A stripped-down version of the big language.

ANSI X3.113-1987: Programming Language Full BASIC

Specification for the BASIC programming language, which has existed in a vast range of different versions.

ANSI X3.113a-1989: Modules and Individual Character Input for Full Basic

Some extensions to X3.113.

ANSI X3.124-1985: Graphical Kernel System (GKS) Functional Description

Specifications for a hardware-independent method for specifying graphic elements.

ANSI X3.124.1-1985: Graphical Kernel System (GKS) FORTRAN Binding

How to use GKS with the FORTRAN language.

ANSI X3.124.2-1988: Graphical Kernel System (GKS) Pascal Binding

How to use GKS with the Pascal language.

ANSI X3.124.3-1989: Graphical Kernel System (GKS) Ada Binding

How to use GKS with the Ada language.

ANSI X3.159-1989: Programming Language C

Formal Specifications for the C Language (ANSI C).

ISO/IEC Standards

These are formation processing standards under the sponsorship of The International Organization for Standardization (ISO) and have generally been developed by the Technical Committee TC97. Standards related to microprocessors under the sponsorship of IEC have been developed by the Technical subcommittee SC47B. Since about 1990, information processing standards for both organizations have been managed by the joint technical committee JTC1.

ISO 646-1983: ISO 7-bit coded character set for information interchange

ISO version of the ASCII character set with (alas) minor differences.

ISO 1538-1984: Programming Language ALGOL 60

One language that was never standardized in the U.S.

ISO 2022-1982: ISO 7-bit and 8-bit coded character sets—Code extension techniques Techniques for extending the codes of ISO 646 and ISO 4873.

ISO 4873-1979: 8-bit coded character set for information interchange

An extended version of ISO 646, which encodes 8 bits to provide an additional 128 codes.

ISO 6429-1983: ISO 7-bit and 8-bit coded character sets—additional control functions for character-imaging devices Extended display and printer controls for ISO 646 and ISO 4873.

ISO 7498-1984: Open Systems Interconnection—Basic Reference Model

Communication Interfaces

As noted earlier, the communication interfaces may be client-server, master-slave, peer-to-peer and blended systems, with different relationships among the various processors and PCUs as designed into the system.

Any allowable (jurisdictionally, by state, county and/or Federal laws and regulations) may be used as the communication standards, with FTP or HTTP standards being the most common and acceptable, but not exclusive, formats used. In each of the computers and processors used, may include a display and a number of input buttons, or touch screen functions, and combinations of these with wired or wireless communication links to enable the player to initiate actions or make responses as required during the game. In a game where the player is playing against the house, the player's hand is displayed face up on the screen as it is dealt and the house hand may be shown face down on the screen. Touch "buttons" can be provided on the screen in addition to or instead of the physical buttons. In a further non-limiting configuration, one or more of the players can be located in separate locations, and the player terminals or hand-held devices or player screens in rooms can be connected to the controller via communication links (e.g., hardwired or wireless). Standard protocols, software, hardware and processor languages may be used in these communication links, without any known limitation. There are hundreds of available computer languages that may be used, among the more common being Ada, ALGOL, APL, awk, BASIC, C, C++, COBOL, DELPHI®, EIFFEL ®, Euphoria, Forth, Fortran, HTML, Icon, JAVA®, JAVASCRIPT®, Lisp, Logo, MATHEMATICA®, MATLAB®, Miranda, Modula-2, Oberon, Pascal, PERL®, PL/I, Prolog, PYTHON®, Rexx, SAS®, Scheme, sed, Simula, Smalltalk, SNOBOL, SQL, VISUAL BASIC®, VISUAL C++®, and XML.

Any commercial processor may be used, either as a single processor, serial or parallel set of processors in the system. Examples of commercial processors include, but are not limited to, MERCED™, PENTIUM™, PENTIUM II XEON™, CELERON®, PENTIUM PRO™, EFFICEON®, ATHLON®, AMD® and the like.

Display screens may be segment display screens, analog display screens, digital display screens, CRTs, LED screens, plasma screens, liquid crystal diode screens, and the like.

The initial expectation is that the chipless table will be considered a table game and regulated as such. However, all of the hardware and software must comply with the regulatory requirements for a table game. The table with all of the components must comply with UL and CUL requirements. Compiled computer code when available for display has a statement on the first page that "the code is confidential and is the proprietary property of Shuffle Master, Inc." per NRS 603.010 et seq. and NRS 600A et seq.

a. Creative organization and sequencing should be unnecessary to the lock and key function.
b. Arbitrary programming instructions may be used and they may be arranged in a unique sequence to create a purely arbitrary data stream to create a level of security in the system.
c. All computer code on the system should be ciphered.

Terminology for on-screen display items may include at least some or all of:

Player balance
Amount bet
Win amount
Recall previous bets
Cash out
Clear all bets
Bankroll
Wager—value only near chips
Value only near chips
Rebet Special requirements that may be on the card delivery systems (or other delivery system) include:

Report button presses to game controller.

Use lamps and LCD display for results (dealer information).

Special requirements that may be on the i-DEAL® shuffler system (or other shuffler system):

Accepting configuration from the game controller.

Report button presses to game controller.

The game controller in one embodiment is programmed with a rule that a game cannot commence until at least one player has a non zero balance and preferably that no games are allowed to be played when no bets have been placed. The system is configurable to account for varying independent casino rules and various gaming regulations. Embodiments of the system include error recovery procedures. Specifications of popular side bets are incorporated into the coding to allow implementation. Multi-game functionality is provided. Embodiments of the proposed system allow for progressive jackpots.

Exemplary player displays are 15-inch and 1024×768 pixels or dots. The touch screen overlay in one example is preferably about 15-inch and 1024×768 pixels or dots. The size and resolution of a preferred dealer display and touch screen is 6.5 inches and from 512 to 1024 pixels per line (or higher definition). The screen resolution is a matter of cost and image quality resolution.

What is claimed:

1. A system for monitoring the play of a casino wagering game, comprising:
- a gaming table;
- a game controller programmed to administer a casino wagering game on the gaming table;
- a plurality of electronic player displays that is configured to operate with the game controller, wherein each electronic player display of the plurality includes:
  - a first area configured to provide a player with alphanumeric information oriented to be read by a player of the casino wagering game, and at least one player interface to enable credit wagering; and
  - a second area configured to display alphanumeric information conveying a dealer-only message that is oriented to be read in a right-side up orientation from a dealer's perspective by a dealer for the casino wagering game, wherein the message is selected from the group consisting of a player action, a player decision, player cards for at least one hand, a game instruction, a dealer instruction, a dealer action, and a game outcome; and
- a dealer interface for the dealer to administer the casino wagering game.

2. The system of claim 1, wherein the at least one player interface comprises touch screen controls.

3. The system of claim 2, wherein the dealer interface is configured to perform one or more functions selected from the group consisting of a player buy in, a player cash out, enabling the at least one player interface, disabling the at least one player interface, transferring credits, a dealer log in, a dealer log out, a notification of a dealer blackjack, and a reconciliation of wagers.

4. The system of claim 2, wherein the touch screen controls are configured to receive player input credit wagers.

5. The system of claim 1, further comprising a card-handling device with an integrated card-reading device, wherein the card-handling device is selected from the group consisting of a shoe and a shuffler.

6. The system of claim 1, further comprising an upright display in communication with the game controller, the upright display to display communal game information.

7. The system of claim 6, wherein the upright display is a double-sided display that includes a first side configured to display first information directed to players of the casino wagering game, and a second side configured to display second information directed to a casino pit area.

8. The system of claim 7, wherein the second information is displayed on a pit display on the second side of the upright display, the pit display having touch screen controls.

9. The system of claim 7, wherein the first information directed to the players of the casino wagering game is selected from the group consisting of a pay table, a casino wagering game name, a casino name, a casino wagering game logo, a casino logo and a casino advertisement.

10. The system of claim 1, wherein each of the plurality of electronic player displays is flush mounted into a top surface of the gaming table.

11. The system of claim 1, wherein the gaming table has a fabric-covered upper surface that lacks game-specific markings.

12. The system of claim 1, wherein the gaming table comprises a tabletop formed from multiple rigid layers, and wherein at least some components of the system are enclosed within the rigid layers of the tabletop.

13. The system of claim 1, wherein the alphanumeric information displayed in the second area is presented in a first orientation to be read by the dealer and in a second orientation to be read by the player.

14. The system of claim 1, wherein the second area includes touch screen controls for use by the dealer.

15. The system of claim 1, further comprising a processor configured to execute software that causes the system to prevent betting after a first card is dealt during play of a casino wagering game, except as additional wagers are allowed during play of the casino wagering game, and then only allowing limited wagers and specific wagers at specific times in the play of the casino wagering game.

16. The system of claim 1, wherein the second area of each electronic player display of the plurality includes dealer controls enabling the dealer to input play information selected from the group consisting of concluding the play of a hand, activating a player display to request player commands, deactivating the player display, indicating close of wagering, setting hands, and rearranging hands.

17. A dual-function programmable player display, comprising:
- an electronic display screen comprising a first area configured to display player game play information having alphanumeric information in a first orientation to be read by at least one player of a casino wagering game, and a second area configured to display dealer information conveying a dealer-only message in a second orientation to be read by a dealer of the casino wagering game, wherein the dealer-only message is selected from the group consisting of a player action, a player decision, player cards for at least one hand, a game instruction, a dealer instruction, a dealer action, and a game outcome, wherein the alphanumeric information having a first orientation to be read by the at least one player includes different information than the alphanumeric information having a second orientation to be read by the dealer; and
- touch screen controls in at least the first area enabling the at least one player to place wagers and input play decisions that are displayed in the second area for use by the dealer.

18. The dual-function programmable player display of claim 17, further comprising a card-reading device for reading at least the rank of a card prior to delivery to a player, wherein the card-reading device is selected from the group consisting of an overhead card-imaging system, and a tabletop card-reading system.

19. The dual-function programmable player display of claim 18, wherein the electronic display screen is programmed to enable a dealer to view player cards and set a player hand.

20. The dual-function programmable player display of claim 18, further comprising touch screen controls in the second area.

21. The dual-function programmable player display of claim 20, wherein the touch screen controls are used by the dealer to indicate a function selected from the group consisting of resolving a hand, identifying a winner, enabling wagering, disabling wagering, and setting a hand.

22. The dual-function programmable player display of claim 17, wherein the second area is touch screen enabled for the dealer to input play information.

23. An electronic gaming table, comprising a plurality of player betting positions, each player betting position having an electronic player display configured to include:

a first area configured to display alphanumeric information directed to and oriented to be read by a player in a first orientation at a corresponding player betting position; and a second area to display alphanumeric information conveying a dealer-only message directed to and oriented to be read by a dealer of a wagering game, wherein the alphanumeric information directed to and oriented to be read by the player includes different information than the alphanumeric information conveying the dealer-only message directed to and oriented to be read by the dealer in a second orientation.

24. The electronic gaming table of claim 23, wherein the second area is configured to receive inputs from the dealer.

25. The electronic gaming table of claim 23, wherein the dealer-only message is selected from the group consisting of a player action, a player decision, player cards for at least one hand, a game instruction, a dealer instruction, a dealer action, and a game outcome, and wherein the dealer-only message, including any player cards, are, as a whole, oriented to be read by the dealer in a right-side up orientation from the dealer's perspective.

* * * * *

UNITED STATES PATENT AND TRADEMARK OFFICE

CERTIFICATE OF CORRECTION

PATENT NO. : 8,262,475 B2
APPLICATION NO. : 12/218583
DATED : September 11, 2012
INVENTOR(S) : Roger M. Snow et al.

It is certified that error appears in the above-identified patent and that said Letters Patent is hereby corrected as shown below:

In the specification:

| | | | |
|---|---|---|---|
| | COLUMN 20, | LINE 18, | change “EIFFEL ®,” to --EIFFEL®,-- |
| | COLUMN 20, | LINE 27, | change “PENTIUM™,” to --PENTIUM®,-- |

In the claims:

| | | | |
|---|---|---|---|
| CLAIM 16, | COLUMN 22, | LINE 38, | change “activating a player” to --activating an electronic player-- |
| CLAIM 16, | COLUMN 22, | LINE 39, | change “the player” to --the electronic player-- |

Signed and Sealed this
Sixth Day of October, 2015

Michelle K. Lee
*Director of the United States Patent and Trademark Office*